United States Patent [19]

Magnuson et al.

[11] Patent Number: 5,394,782
[45] Date of Patent: Mar. 7, 1995

[54] SHEARING APPARATUS

[75] Inventors: James M. Magnuson, Kankakee; Brian G. Jaska, Watseka, both of Ill.

[73] Assignee: Peddinghaus Corporation, Bradley, Ill.

[21] Appl. No.: 73,123

[22] Filed: Jun. 7, 1993

[51] Int. Cl.$^6$ .............................................. B26D 9/00
[52] U.S. Cl. ...................................... 83/605; 83/518; 83/599; 83/608; 83/699.51
[58] Field of Search ................. 83/513, 515, 518, 527, 83/599, 605, 606, 608, 620, 640, 682, 683, 699

[56] References Cited

U.S. PATENT DOCUMENTS

| | | | |
|---|---|---|---|
| 723,599 | 3/1903 | Grimm | 83/620 |
| 1,259,801 | 3/1918 | Stich | 83/518 |
| 3,131,589 | 5/1964 | Hazelton et al. | 83/640 X |
| 3,181,407 | 5/1965 | Pearson | 83/640 X |
| 3,263,541 | 8/1966 | Stockard, Jr. | 83/646 X |
| 3,371,569 | 3/1968 | Pearson et al. | 83/640 X |
| 3,701,276 | 10/1972 | Malmgren | 83/518 X |
| 3,866,522 | 2/1975 | Oswalt, Jr. | 83/599 X |
| 4,067,252 | 1/1978 | Peddinghaus et al. | 83/571 |
| 4,463,642 | 8/1984 | Minato et al. | 83/640 X |
| 4,660,451 | 4/1987 | Bjorkheim | 83/608 X |
| 4,854,201 | 8/1989 | Shinozawa et al. | 83/527 X |
| 5,170,689 | 12/1992 | Dvorak | 83/518 X |

FOREIGN PATENT DOCUMENTS 458678 4/1928 Germany.
7328336 8/1973 Germany.

OTHER PUBLICATIONS

Peddinghaus Peddicat: "for shearing, punching and notching".
Peddinghaus "Peddiworker with five work stations".
Peddinghaus Peddimaster: "for shearing, punching and notching".
Piranha Model P/50.50 TON.
Scotchman 40 to 120 Ton Capacity Hydraulic Iron Workers.
Uni-Hydro 55-24 Ironworker & 70-24 Ironworker.
Mubea Profi 500.
Geka Intelligent power.
Kingsland Hydraulics Steelworkers 50XA-65XA.

Primary Examiner—Eugenia Jones
Attorney, Agent, or Firm—Dressler, Goldsmith, Shore & Milnamow, Ltd.

[57] ABSTRACT

An apparatus is provided for selectively shearing angle iron and flat stock. The apparatus has a frame defining a receiving station for separately receiving angle iron or flat stock. The receiving station includes a stationary shear blade assembly having two shearing edges extending from a vertex to define a generally 90° angle inside corner. A first arm is pivotally mounted to the frame about a first pivot axis. A second arm is pivotally mounted to the first arm for pivoting movement about a second pivot axis. The second arm includes a movable shear blade assembly having two shearing edges directed outwardly to define a generally 90° angle outside corner. An actuator is mounted on the frame for pivoting the first arm about the first pivot axis between open and closed positions. The second arm defines a guide way, and the frame has a guide member which is selectively positionable relative to the first axis for slidably engaging the guide way to pivot the second arm about the second pivot axis.

18 Claims, 20 Drawing Sheets

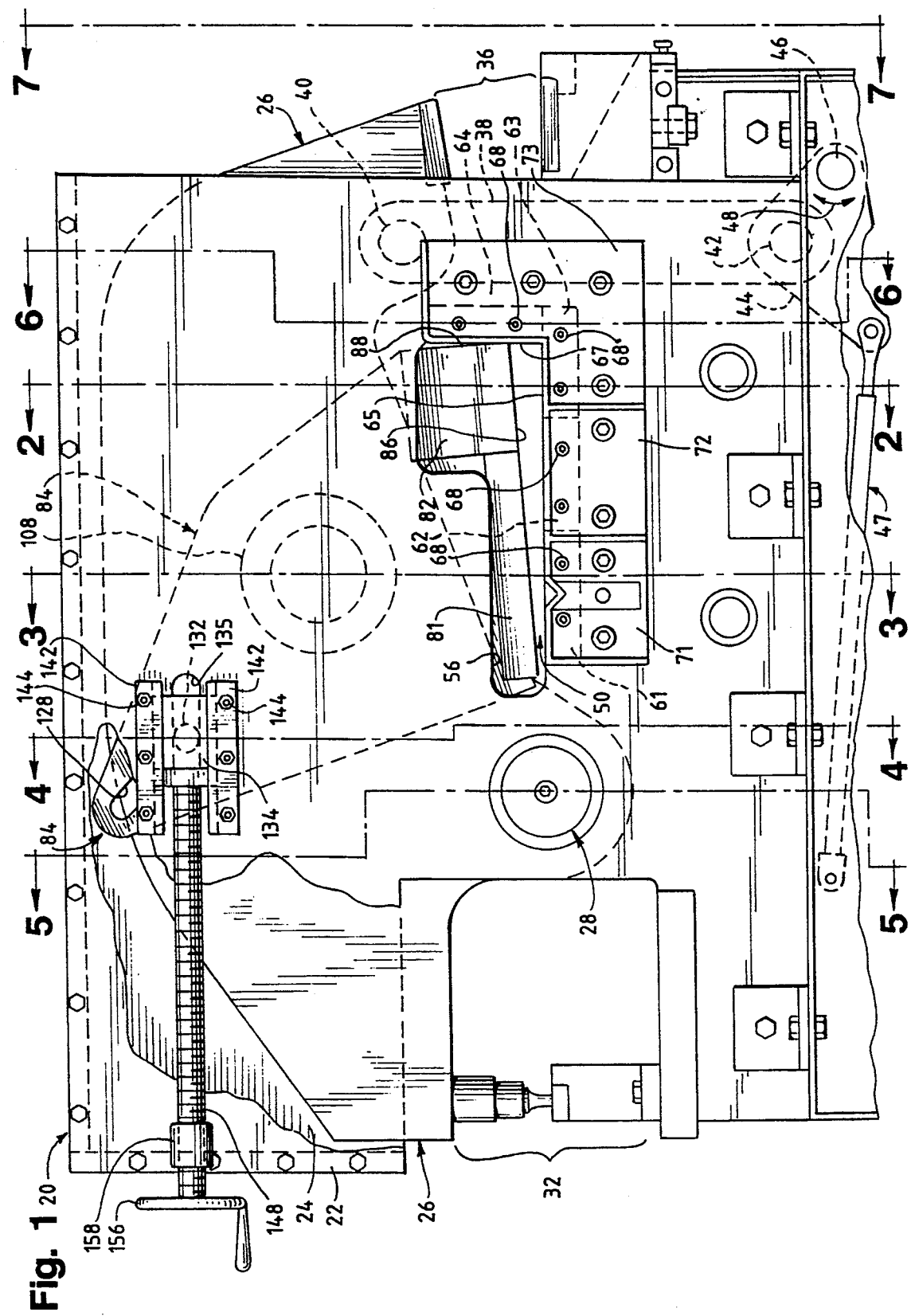

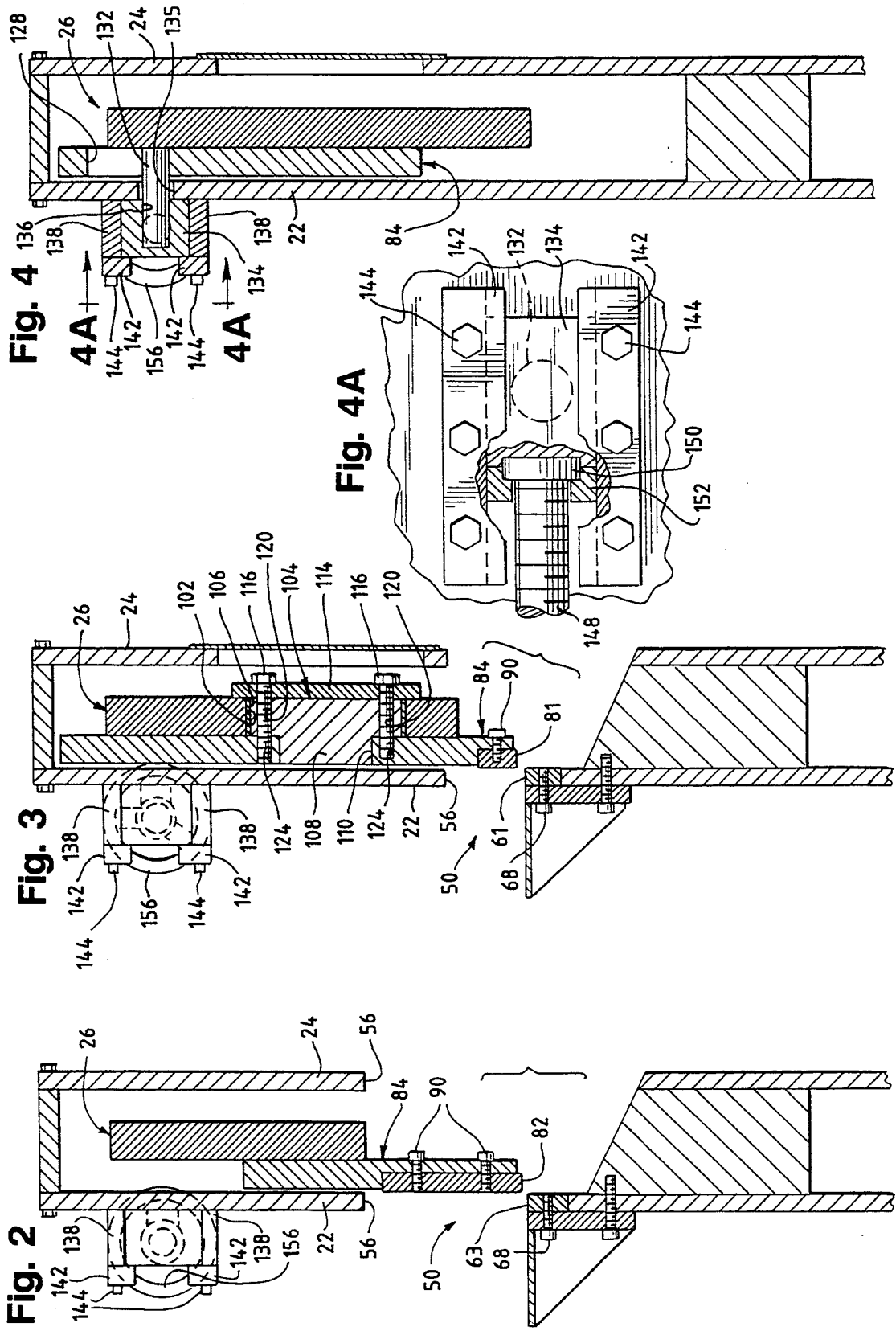

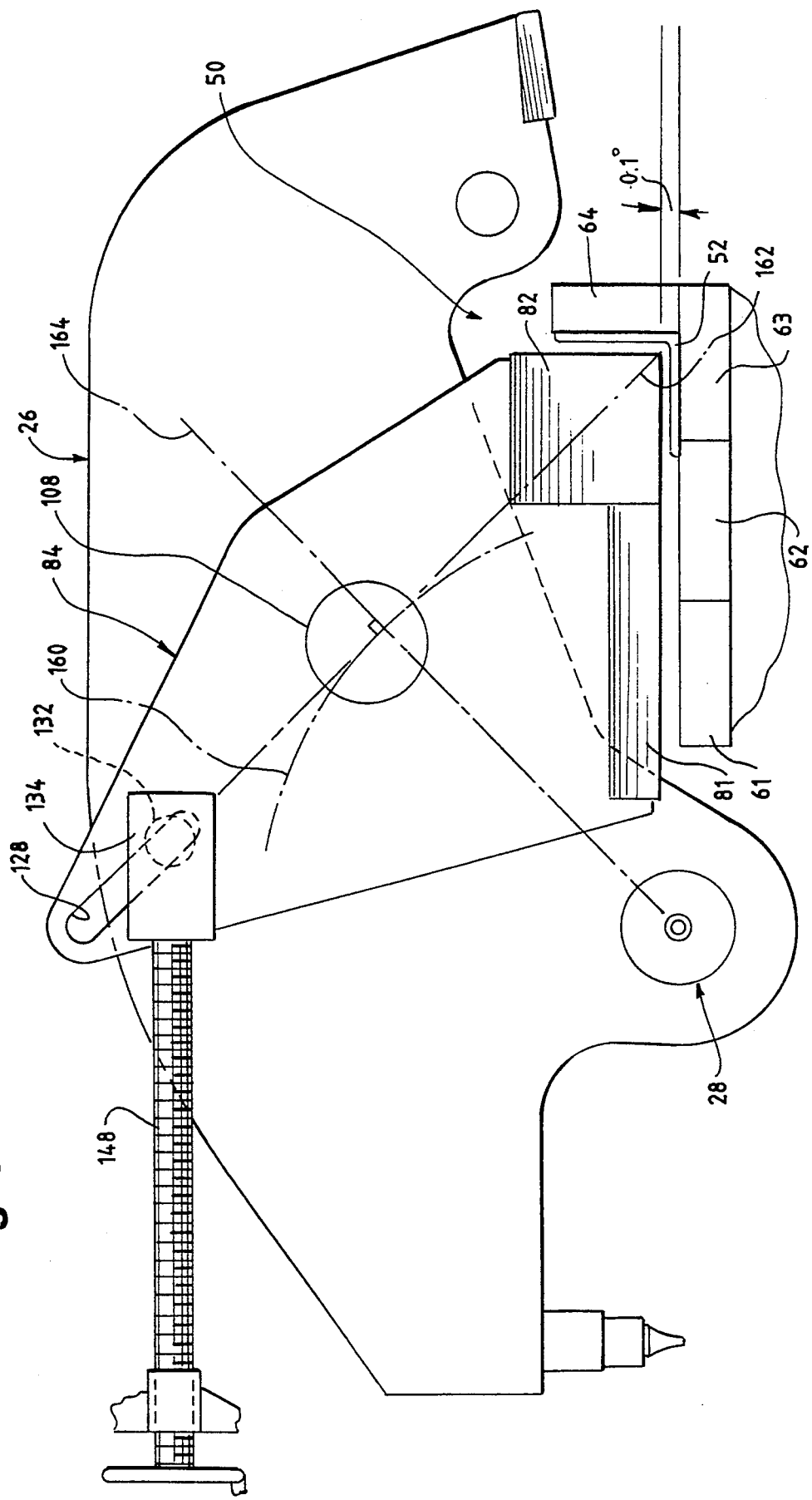

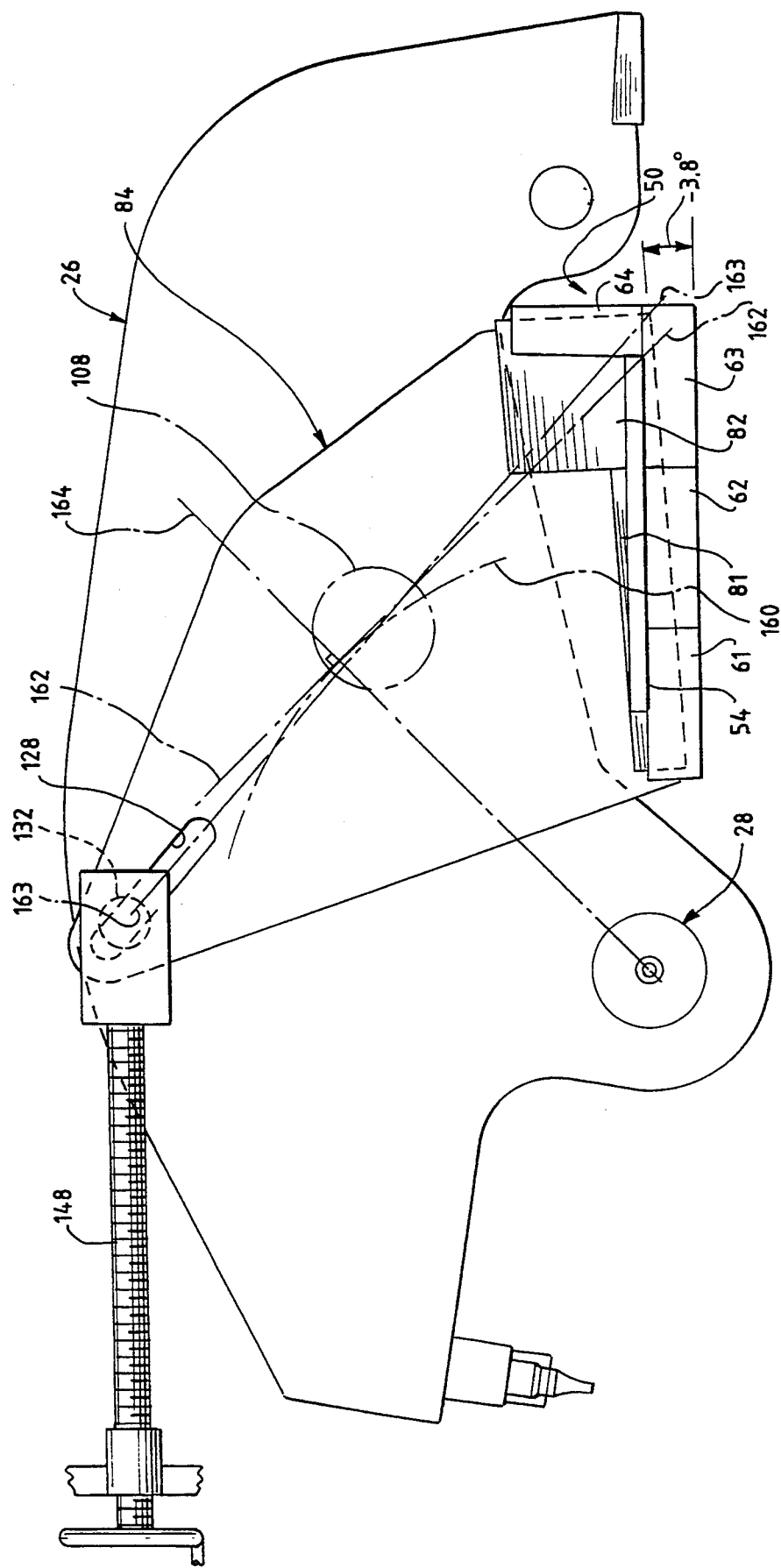

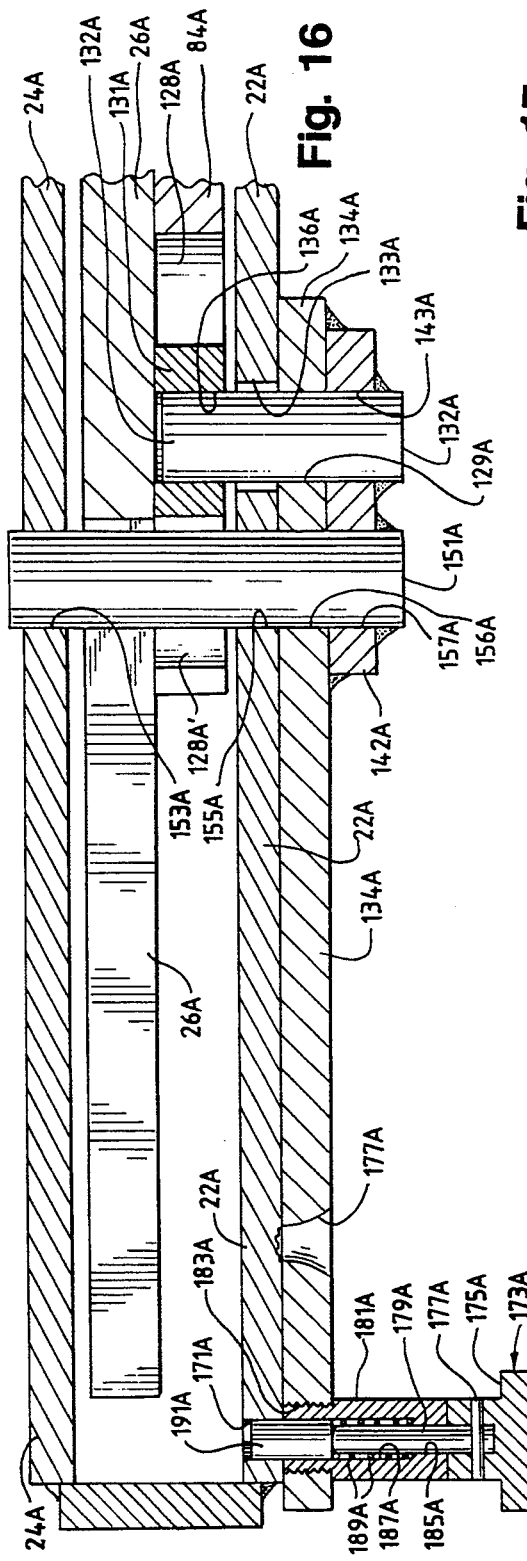
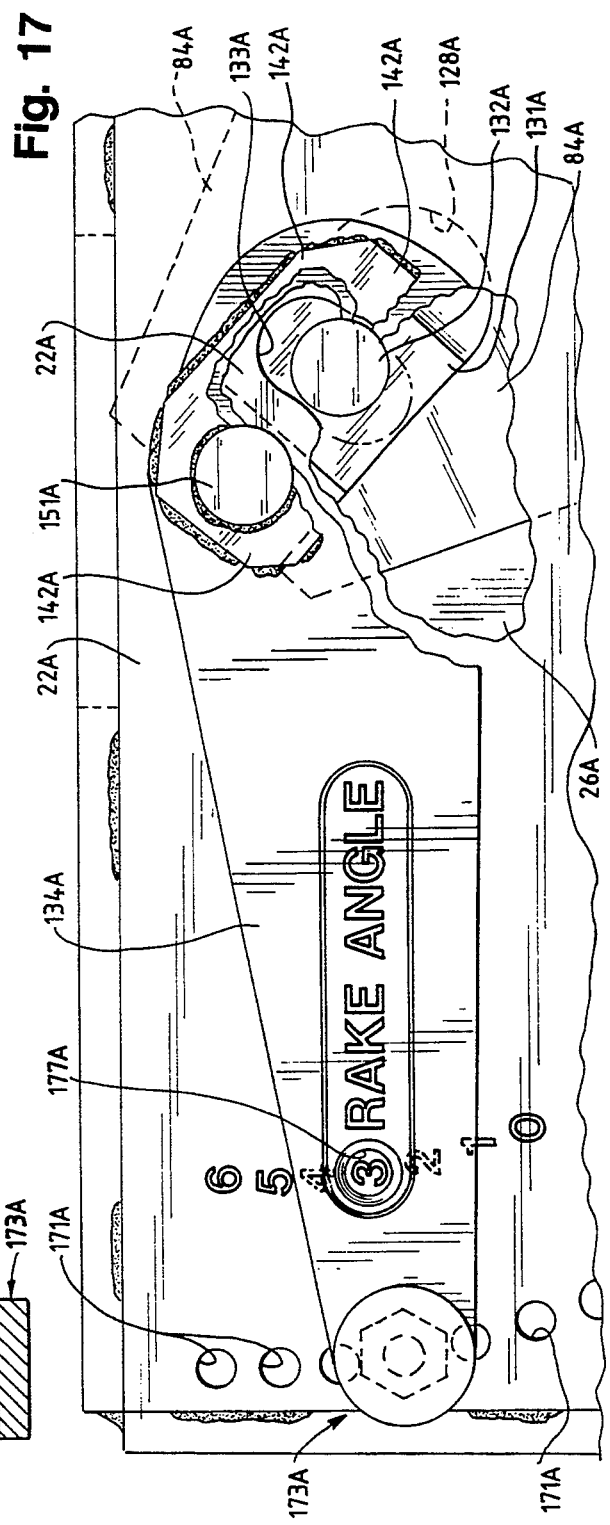

SHEARING APPARATUS

TECHNICAL FIELD

This invention relates to a machine having a blade on a pivotally mounted arm for shearing metal workpieces, including flat bar or plate.

BACKGROUND OF THE INVENTION AND TECHNICAL PROBLEMS POSED BY THE PRIOR ART

Machine shops, structural steel plants, manufacturing facilities, and the like may employ machines for shearing metal workpieces, such as steel stock of various shapes and sizes. One type of machine, commonly known as an "ironworker" or "universal steelworker" performs four or five different metal working processes on workpieces at four or five separate stations. Typically there is a punching station for punching holes or other shapes, a notching station for notching the edge of a workpiece, a bar stock shearing station for shearing lengths of round or square bars, an angle iron section shearing station for cutting angle iron, and a flat stock shearing station for cutting flat bar or plate.

An example of such an ironworker design is described in the U.S. Pat. No. 3,866,522. The ironworker machine employs a single, large arm or beam 12 which is pivotally mounted to the frame and which is operated with a hydraulic piston and cylinder actuator. The various stations, such as a punching station 52, a flat stock shearing station 48, an angle cutting station 74, and a notching station 54, are defined at various locations along the length of the pivotally mounted beam. Such an ironworker design provides the advantages of simple operation and low cost.

Although the conventional pivoting beam ironworker machines function generally satisfactorily, there are some disadvantages associated with such machines. In particular, because the pivoting beam necessarily swings the shearing blade or blades through an arc as the workpiece is sheared, the blades and/or dies wear more quickly. Further, as the blade swings through an arc while cutting flat stock, there is a change in the angle of the blade cutting edge relative to the flat stock. Thus, the material is not cut at a constant, optimal angle. In view of this problem, it would be desirable to provide a system for adjusting the angle of the moving shear blade to accommodate various flat stock materials and to accommodate workpieces of various sizes. Preferably, such a system should easily accommodate relatively rapid adjustment.

In addition to cutting flat stock, a shear machine should desirably have the capability for cutting angle iron. In order to cut angle iron with a single, moving blade, both legs of the angle iron must be cut by the blade substantially simultaneously and symmetrically so as to avoid binding. Conventional ironworker machines typically have separate stations for angle shearing and plate shearing as discussed above. With a pivoting beam machine, separate stations are normally used for flat plate and angle iron because the angle iron shearing station requires the moving blade to be moved through the angle iron legs at only a very small oblique angle— preferably as close as possible to a 0° angle—while the flat stock is much more easily sheared with one of the blades at a significant angle to provide a "scissors" cutting effect. Thus, in conventional ironworker machines, the blades at the angle iron shearing station are arranged so that the shearing blade moves at only a small an angle as possible through the legs of the angle iron; however, the blades of the flat stock shearing station are arranged so that the moving blade shears the flat stock at a sufficient angle.

The use of separate stations in a pivoting beam ironworker machine for shearing angle iron and flat stock necessarily requires that the machine be large enough to accommodate the two separate stations. Further, separate blade assemblies are required, and this results in an increase in the cost of the machine. Accordingly, it would be desirable to provide an improved machine in which the angle iron shearing and the flat stock shearing could be effected at a common station. This would permit the use of a common set of blades and reduce the initial cost of the machine. Additionally, a common station would permit the overall size of the machine to be reduced.

The present invention provides an improved apparatus for shearing flat stock with an adjustable angle blade, and in the preferred form, the improved apparatus accommodates the selective shearing of angle iron and flat stock at a common receiving station.

SUMMARY OF THE INVENTION

An apparatus in accordance with the teachings of the present invention provides a novel system for adjusting the angle of a shearing blade. The apparatus includes a frame which defines a receiving station for receiving flat stock. The receiving station has a stationary shear blade assembly having at least one shearing edge.

An arm assembly includes a first arm pivotally mounted to the frame about a first pivot axis. The arm assembly includes a second arm mounted to the first arm for pivoting movement about a second axis. The second arm includes a movable shear blade assembly defining at least one shearing edge.

An actuator is mounted on the frame for pivoting the arm assembly about the first pivot axis between an open position in which the movable and stationary shear blade assemblies are spaced apart and a closed position in which the shear blade assemblies are closer together.

The second arm defines a guide way, and the frame has a guide member which is selectively positionable relative to the first axis for slidably engaging the guide way to pivot the second arm about the second axis. This results in the orientation of the movable shear blade relative to the stationary shear blade changing in a predetermined relationship as the arm assembly pivots between the open and closed positions.

In a preferred form of the invention, the apparatus is adapted for selectively shearing angle iron and flat stock at a common receiving station. The frame defines the common receiving station for separately receiving the angle iron and flat stock. The receiving station includes a stationary shear blade assembly having two shearing edges extending from a vertex to define a generally 90° angle inside corner.

An arm assembly includes a first arm pivotally mounted to the frame about a first pivot axis. The arm assembly includes a second arm mounted to the first arm for pivoting movement about a second pivot axis. The second arm includes a movable shear blade assembly having two shearing edges directed outwardly to define a generally 90° angle outside corner.

An actuator is mounted on the frame for pivoting the arm assembly about the first pivot axis between an open position in which the movable and stationary shear blade assemblies are spaced apart and a closed position in which the shear blade assemblies are in an overlapped, adjacent configuration.

The second arm defines a guide way, and the frame has a guide member which is selectively positionable relative to the first axis for slidably engaging the guide way to pivot the second arm about the second pivot axis. This results in the orientation of the movable shear blade relative to the stationary shear blade changing in a predetermined relationship as the arm assembly pivots between the open and closed positions.

Numerous other advantages and features of the present invention will become readily apparent from the following detailed description of the invention, from the claims, and from the accompanying drawings.

BRIEF DESCRIPTION OF THE DRAWINGS

In the accompanying drawings that form part of the specification, and in which like numerals are employed to designate like parts throughout the same, FIG. 1 is a fragmentary, side elevational view of the apparatus of the present invention with portions broken away to illustrate interior detail;

FIGS. 2, 3, 4, 5, and 6 are fragmentary, cross-sectional views taken generally along the planes 2—2, 3—3, 4—4, 5—5, and 6—6, respectively, in FIG. 1;

FIG. 4A is a greatly enlarged, fragmentary, side elevational view taken generally along the plane 4A—4A in FIG. 4;

FIG. 8 is a partially diagrammatic, simplified, side elevational view of the apparatus arm assembly shown in an open position for cutting angle iron;

FIG. 14 is a view similar to FIG. 13 and shows the arm assembly moved further to carry the movable shear blade completely through the flat stock;

FIG. 16 is a fragmentary, cross-sectional view taken generally along the plane 16—16 in FIG. 15;

FIG. 17 is an enlarged, fragmentary, side elevational view similar to FIG. 15.

DESCRIPTION OF THE PREFERRED EMBODIMENTS

While this invention is susceptible of embodiment in many different forms, this specification and the accompanying drawings disclose only some specific forms as examples of the invention. The invention is not intended to be limited to the embodiments so described, however. The scope of the invention is pointed out in the appended claims.

For ease of description, the apparatus of this invention is described in the normal (upright) operating position, and terms such as upper, lower, horizontal, etc., are used with reference to this position. It will be understood, however, that the apparatus of this invention may be manufactured, stored, transported, and sold in an orientation other than the position described.

FIGURES illustrating the apparatus show some mechanical elements that are known and that will be recognized by one skilled in the art. The detailed descriptions of such elements are not necessary to an understanding of the invention, and accordingly, are herein presented only to the degree necessary to facilitate an understanding of the novel features of the present invention.

Figure 5:
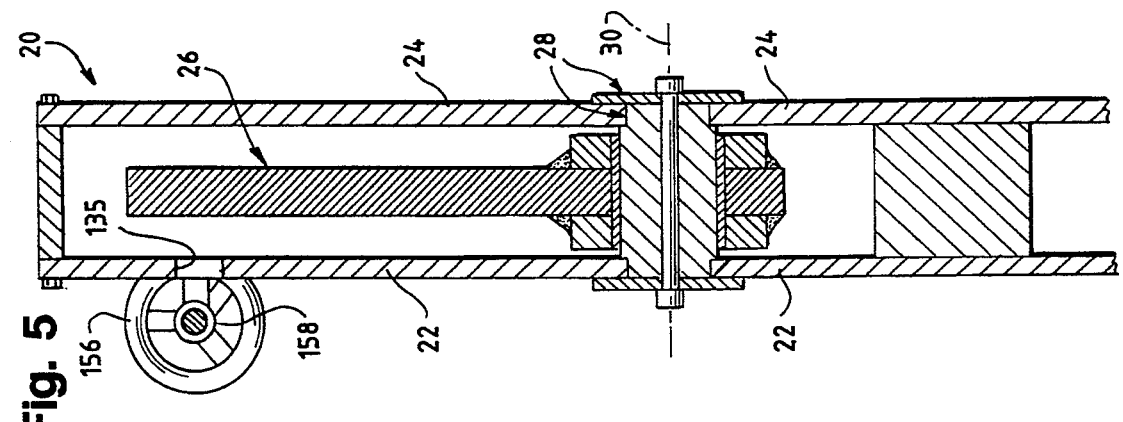

A novel ironworker type of machine tool apparatus in accordance with the present invention is illustrated in FIG. 1 and is designated generally therein by the reference numeral 20. As illustrated in FIGS. 1 and 5, the apparatus 20 has a frame that includes a front cover or wall 22 and a rear cover or wall 24. A main pivoting beam or first arm 26 is pivotally mounted to the frame walls 22 and 24 with a central bearing assembly 28 for pivoting about a first axis 30 (FIG. 5). This assembly 28 may be of any suitable conventional or special design, the details of which form no part of the present invention.

With reference to FIG. 1, the left-hand end of the arm 26, together with the frame, defines a punching station 32 containing conventional punch-holder, punch, and die components. The right-hand end of the arm 26, together with the frame, defines a notching station 36 containing conventional upper and lower notching blade components. The punching station 32 and the notching station 36 are operated by pivoting the main arm 26 counterclockwise or clockwise, respectively, in a well known manner.

Figure 7:
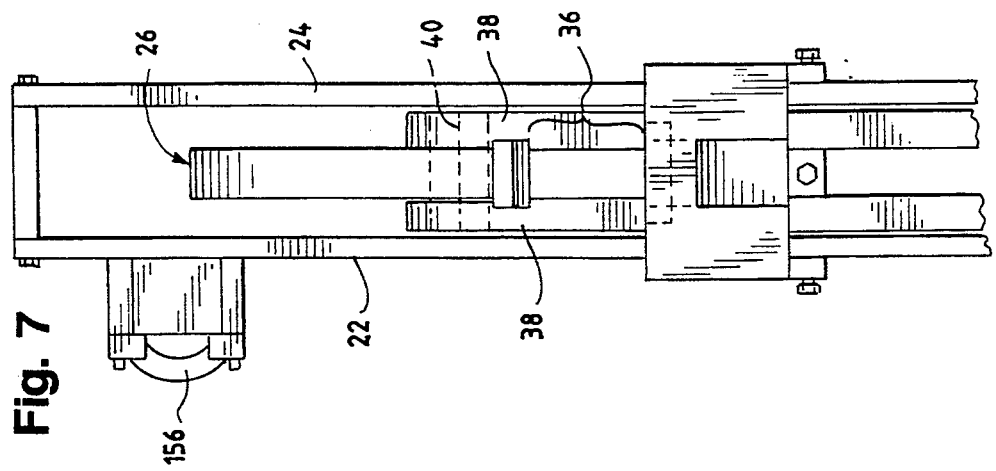
FIG. 7 is a fragmentary, end view taken generally along the plane 7—7 in FIG. 1.

Specifically, a pair of links 38 are pivotally connected to the right-hand end of the arm 26, just inwardly of the notching station 36, via a pin or shaft 40 as shown in FIGS. 1 and 7. The lower end of each link 38 is pivotally connected with a pin or shaft 42 to a crank arm 44 which is pivotally mounted to the frame with a pivot pin or shaft 46. A lower end of crank arm 44 (FIG. 1) is pivotally connected to a conventional, double acting, hydraulic, piston-cylinder actuator 47 (FIG. 1) for pivoting the crank arm 44 about the pivot shaft 46 in a selected direction of rotation as indicated by the double headed arrow 48.

Thus, depending upon whether the cylinder-piston actuator is retracted or extended, the main arm 26 pivots counterclockwise or clockwise on the main bearing 28 to effect the punching process at the punching station 32 or the notching process at the notching station 36. The use of a double-acting piston-cylinder actuator to pivot a main arm for operating a punching station or a notching station is well known in the art. For example, see the machine design illustrated in U.S. Pat. No. 3,866,522.

The detailed design and operation of the mechanism for pivoting the main arm 26 in the apparatus of the present invention form no part of the present invention. Similarly, the detailed design and operation of the punching station 32 and notching station 36 form no part of the present invention. Indeed, the apparatus of the present invention may be incorporated in a machine which completely lacks any punching station and/or notching station.

In the embodiment of the apparatus illustrated in FIGS. 1-14, the frame defines a common receiving station 50 for separately receiving a piece of angle iron or flat stock. FIG. 8 illustrates a section of angle iron 52 in the receiving station 50, and FIG. 12 illustrates a flat stock bar or plate 54 in the receiving station 50. The apparatus frame defines an opening through the apparatus at the receiving station to accommodate the workpiece (i.e., angle iron or plate). As illustrated in FIG. 1, the frame front wall 22 defines such an opening 56 in conjunction with the rear wall 24.

The receiving station 50 includes a stationary shear blade assembly comprising a first stationary blade 61, and second stationary blade 62, a third stationary blade 63, and a fourth stationary blade 64. The third stationary blade 63 has an edge 65, and the fourth stationary blade 64 has an edge 67. The blade edges 65 and 67 extend from a vertex to define a generally 90° angle inside corner. The tops of the stationary blades 62 and 61 define a horizontal blade edge continuing from the shear edge 65. The blades 61, 62, 63, and 64 are removably mounted to the frame with bolts 68 to conventional blade holder assemblies 71, 72, and 73 which are mounted on the frame front wall 22.

Figure 6:
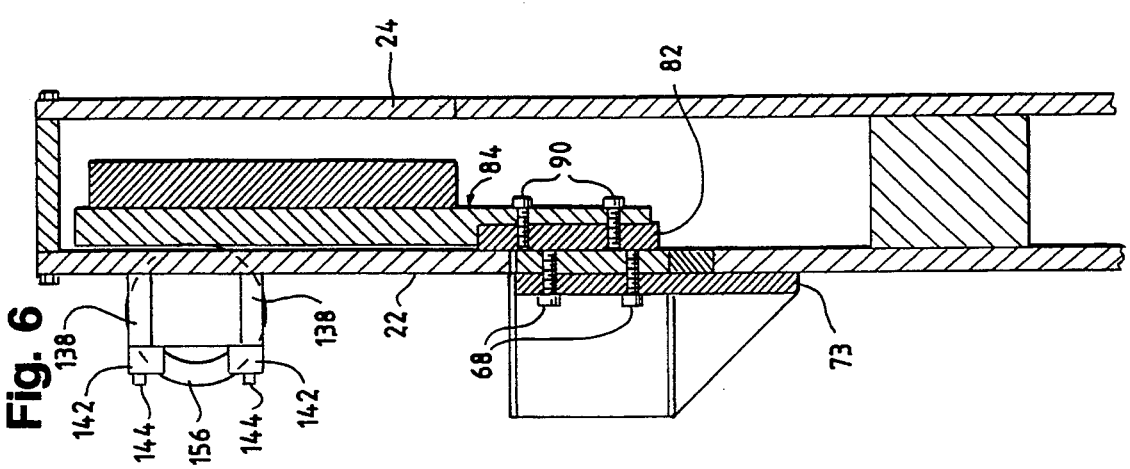

A movable blade assembly comprises a first blade 81 and a second blade 82 which are mounted to a second arm 84 carried on the first arm 26. The movable shear blade assembly second blade 82 has two shearing edges, edges 86 and 88, which are directed outwardly to define a generally 90° angle outside corner. The edge of blade 81 defines a continuation of the shear edge 86. As illustrated in FIG. 6, the moving shear blade 82 is removably mounted with bolts 90 to the second arm 84. The blade 81 is similarly bolted to the second arm 84 as illustrated in FIG. 3.

The second arm 84 is mounted for pivoting movement on the first arm 26 as illustrated in FIG. 3. In particular, the first arm 26 defines a bore 102 in which is received a rotatable shaft 104. A cylindrical bearing 106 is preferably provided in the bore 102 around the shaft 104 to accommodate rotation of the shaft 104 within the bore 102.

The shaft 104 includes a reduced diameter front portion 108 which is received in a bore 110 defined by the second arm 84. The shaft 104 is held in place by a rear retainer plate 114 which is secured with a plurality of bolts 116. The bolts 116 each pass through a bore 120 in the shaft 104 and are threadingly engaged with bores 124 defined in the second arm 84. The rear cover plate 114, bolts 116, second arm 84, and the shaft 104 are thus all fixed together for rotation together about the shaft axis relative to the first arm 26.

As illustrated in FIGS. 1-5, the upper end of the second arm 84 can be adjustably guided relative to the first arm pivot axis 30 (FIG. 5). In particular, as illustrated in FIGS. 1 and 4, the second arm 84 defines a guide way in the form of a slot 128 which receives a guide member in the form of a pin 132 extending inwardly from an adjustment mechanism on the frame front wall 22. The projection of the pin 132 from the adjustment block 134 is accommodated by a generally horizontally disposed slot 135 in the frame wall 22 (FIGS. 1, 4, and 5).

The adjustment mechanism includes a block 134 (FIGS. 1, 4, and 4A) defining a bore 136 (FIG. 4) receiving an end of the pin 132. The block 134 is slidably disposed between a pair of spaced-apart guide bars or tracks 138 (FIGS. 2-4) mounted to the frame front wall 22. A pair of retainer bars 142 (FIGS. 1-4) are secured with bolts 144 to the tracks 138 and extend inwardly over margins of the adjustment block 134 to retain the block 134 within the tracks 138.

The adjustment block 134 is connected to an adjustment shaft 148. As shown in FIG. 4A, the adjustment shaft 148 has an enlarged distal end 150 which is captured with an end block 152 connected to the adjustment block 134. The shaft 148 is free to rotate about its longitudinal axis relative to the adjustment block 134, and the shaft 148 functions to move the adjustment block 134 linearly to a selected position within the guide tracks 138.

The shaft 148 is threaded and is attached at its distal end to a hand wheel 156 (FIG. 1). The shaft 148 is supported on the frame near the handle with a threaded bracket 158. The shaft 148 is threadingly engaged with the threaded bracket 158. Thus, turning the hand wheel 156 causes the threaded shaft 148 to move linearly in one direction or the other along the frame so as to move the adjustment block 134, and pin 132 mounted therein, along the guide tracks 138. In this manner, the pin 132 can be positioned at a selected location relative to the pivot axes of the first arm 26 and second arm 84. With reference to FIG. 1, movement of the pin 132 to the right will cause the arm 84 to pivot clockwise relative to the pivot axis defined by the mounting shaft 108. On the other hand, movement of the pin 132 to the left will cause the second arm 84 pivot in the counterclockwise direction.

The second arm 84 adjustment capability permits the movable shear blade assembly (blades 81 and 82) to be initially positioned at a selected angle that is most appropriate for cutting a particular workpiece. The desired angle depends upon the shape, size, and material of the workpiece.

Because the angle of the second arm 84 can be adjusted, the single receiving station 50 can be employed for shearing angle iron as well as flat stock with the movable blade assembly oriented at an appropriate angle.

Figure 8A:
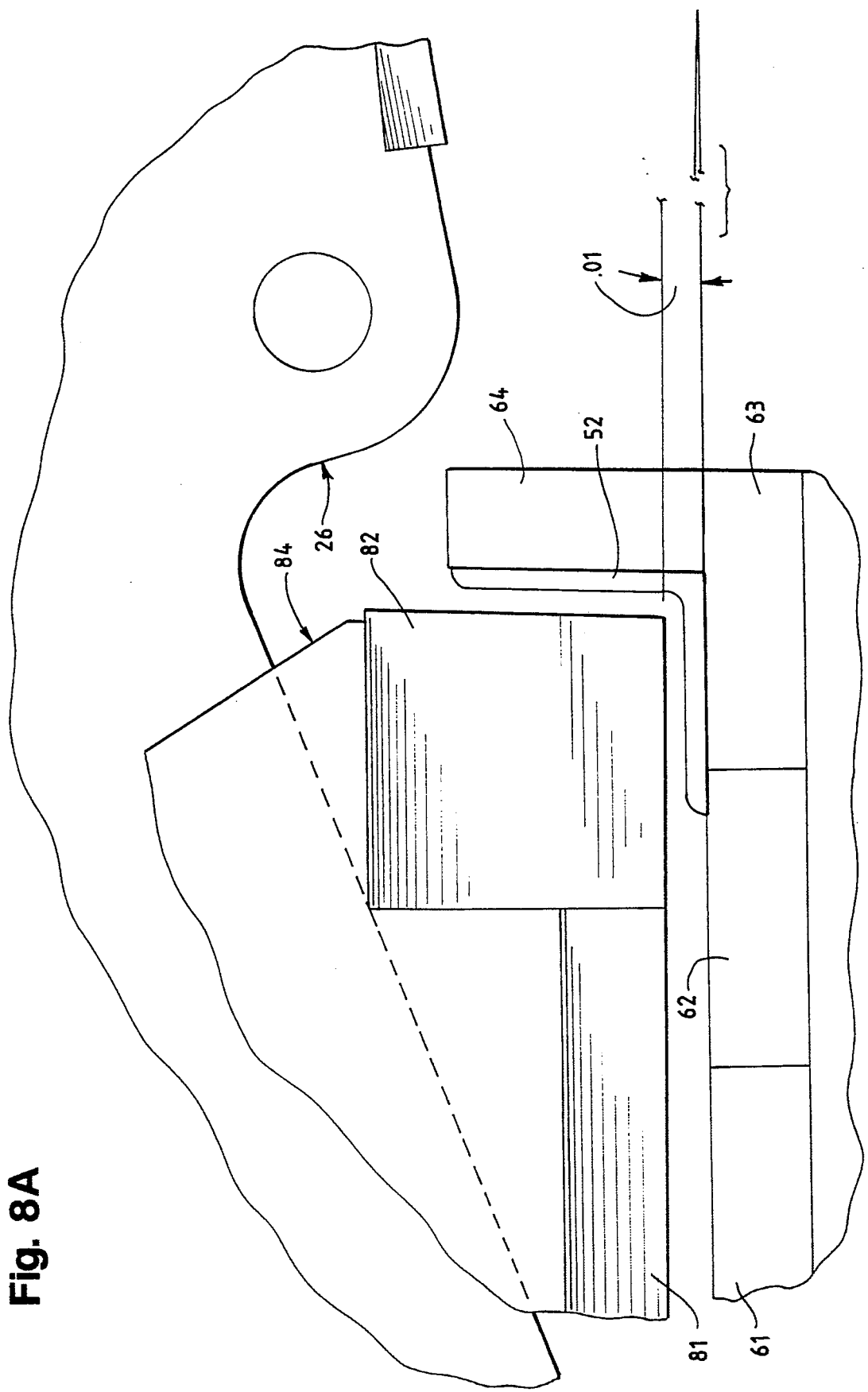
FIG. 8A is a greatly enlarged, fragmentary, view similar to FIG. 8.

FIGS. 8 and 8A illustrate the beginning of the process for shearing the structural steel angle 52. The adjustment member 134 has been moved forwardly with the shaft 148 to position the guide member pin 132 at a location which pivots the arm 84 so that the edges of the movable blades 81 and 82 define a very small angle, about 0.1° relative to the opposing edges of the stationary blade assembly blade 61, 62, and 63. This angle is measured when the arms are at the top of the normal stroke providing sufficient clearance for positioning of an angle iron having ⅜" thick legs. For thicker or thinner angle iron, the top of stroke blade angle would be slightly more or less, respectively, than the 0.1° angle shown.

When the machine is operated to shear the angle iron 52, the above-described hydraulic piston-cylinder actuator is operated to pivot the first arm 26 in the clockwise direction as viewed in FIGS. 8–11. This causes the second arm 84 to be carried downwardly toward the angle iron 52. At the same time, the guide pin 132 causes the second arm 84 to pivot counterclockwise with its shaft 108.

Figure 9:
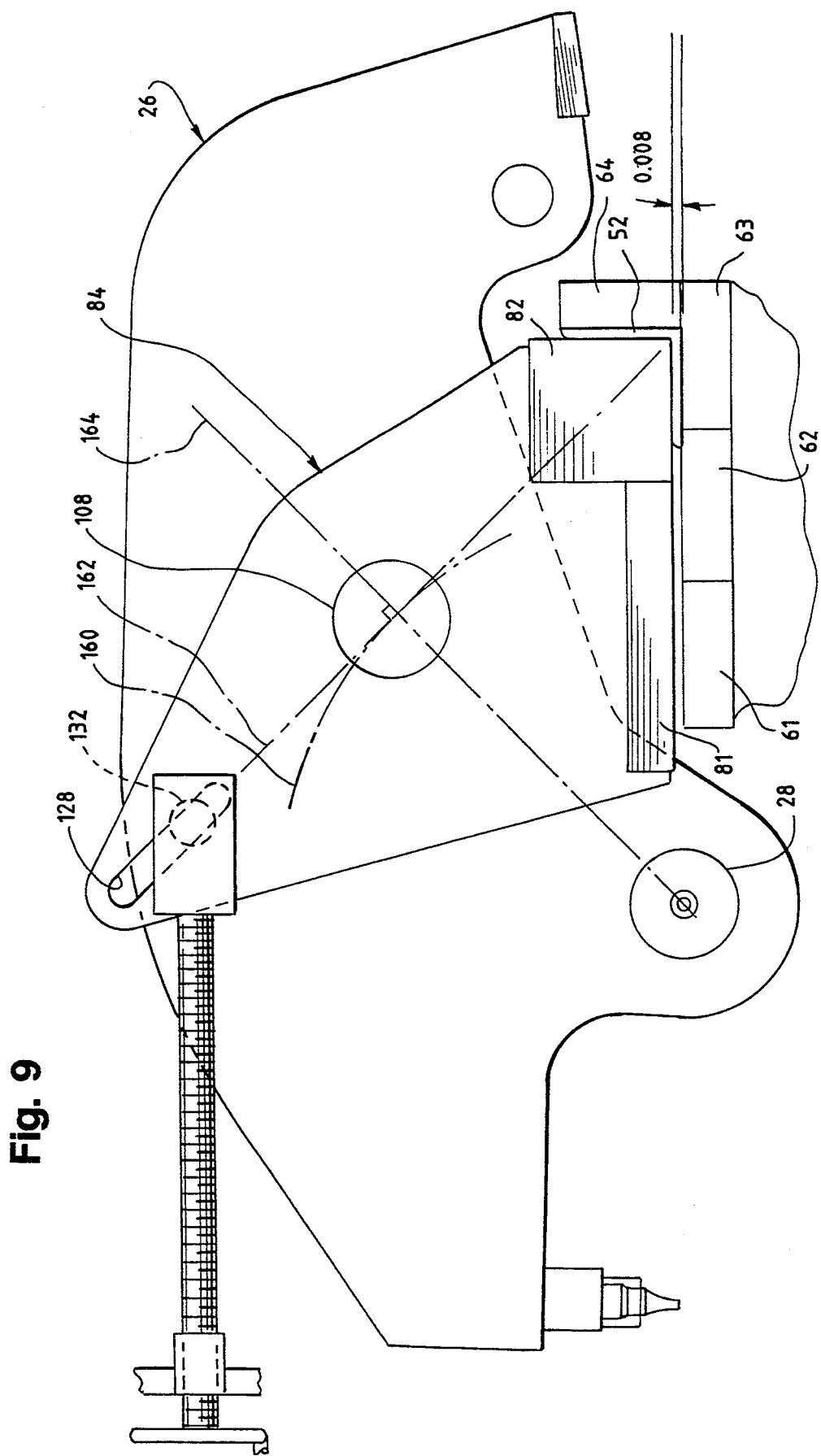
FIG. 9 is a view similar to FIG. 8 and shows a moved position of the arm assembly wherein the movable shear blade is just contacting the angle iron.
Figure 9A:
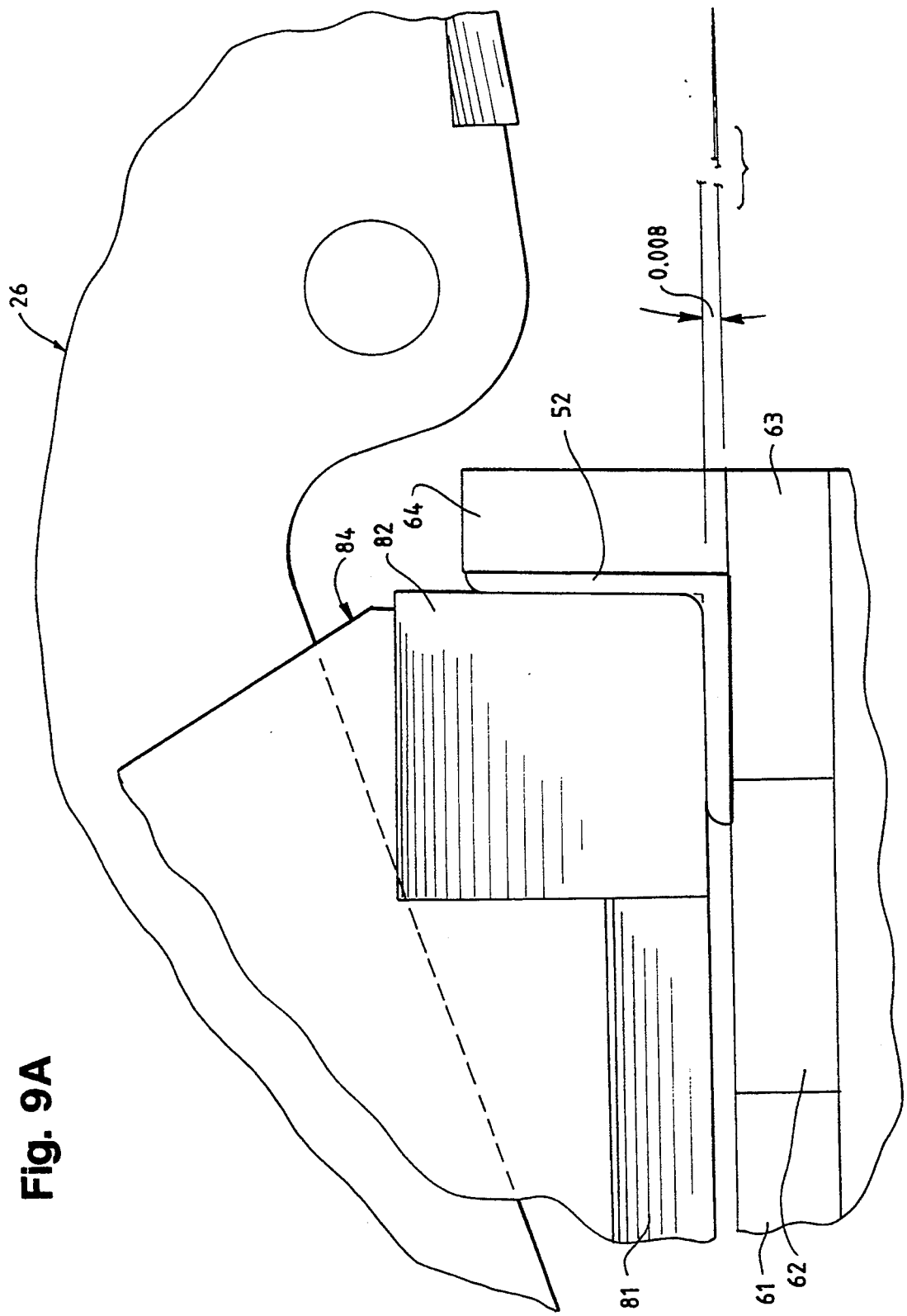
FIG. 9A is a greatly enlarged, fragmentary, view similar to FIG. 9.

FIGS. 9 and 9A illustrate the positions of the components where the movable shear blade 82 has just contacted the angle iron 52. In that position, the angle between the bottom of the movable blade 82 and the top edges of the stationary blades 61, 62 and 63 is 0.008°—and this is very close to 0°. Thus, the vertical edge of the movable shear blade 82 is substantially parallel to the vertical leg of the angle iron 52, and the bottom, horizontal edge of the movable shear blade 82 is substantially parallel to the horizontal leg of the angle iron 52. Both legs of the angle iron 52 are essentially contacted substantially simultaneously by the edges of the movable shear blade 82.

Figure 10:
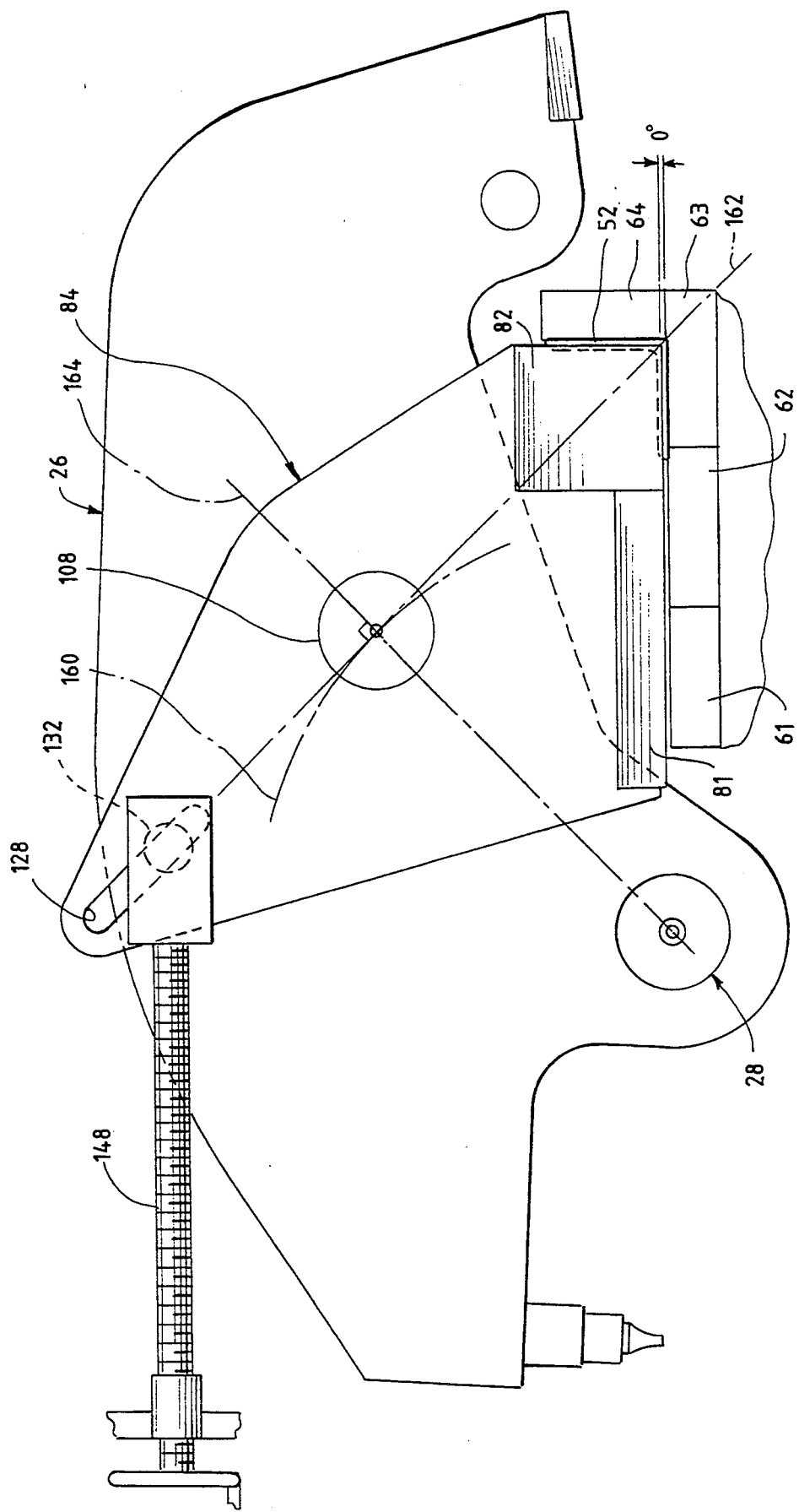
FIG. 10 is a view similar to FIG. 9 and shows the arm assembly moved further to cut about ½ the thickness of the angle iron legs.
Figure 10A:
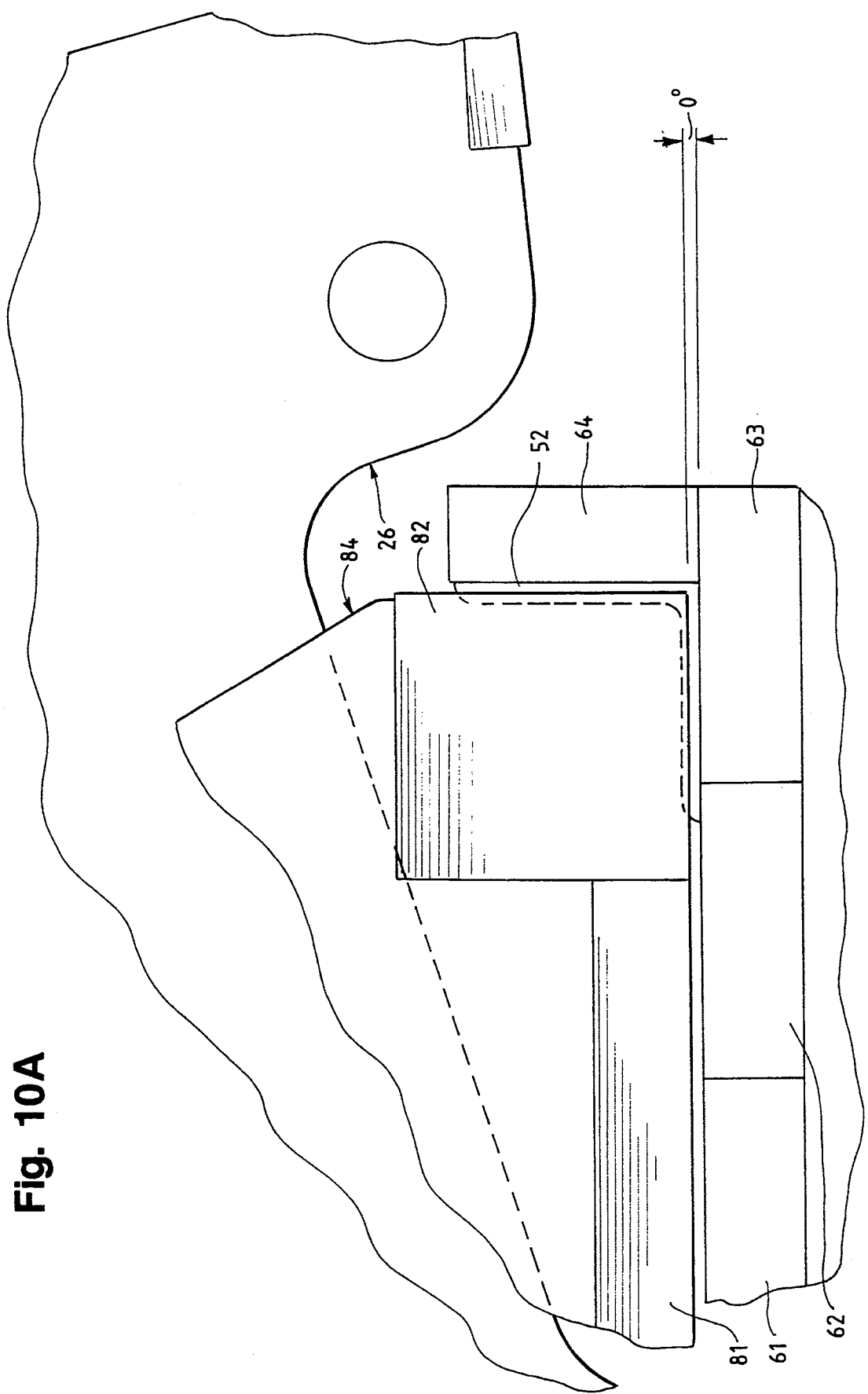
FIG. 10A is a greatly enlarged, fragmentary, view similar to FIG. 10.

Further pivoting movement of the first arm 26 causes the movable shear blades on the second arm 84 to penetrate and begin shearing the angle iron 52. FIGS. 10 and 10A illustrate the position of the movable shear blade 82 after a substantial thickness of the angle iron 52 has been penetrated, and the angle between the movable blades 81 and 82 on one hand and the stationary blades 61, 62, and 63 on the other hand is 0°. That is, the bottom edges of the movable shear blades 81 and 82 are substantially parallel to the top edges of the stationary shear blades 61, 62, and 63. For a ⅜" thick angle iron 52, this position may be characterized as the "design basis" position. In this position, the bottom edges of the movable shear blades 81 and 82 are about ¼" above the top edges of the stationary blades 61, 62, and 63. This design basis arrangement, wherein the upper, movable shear blades are substantially parallel to the lower, stationary blades when the spacing between the movable blades and stationary blades is ¼", functions satisfactorily for various angle iron thicknesses ranging between about ⅜" maximum thickness and about ⅛" minimum thickness.

Figure 11:
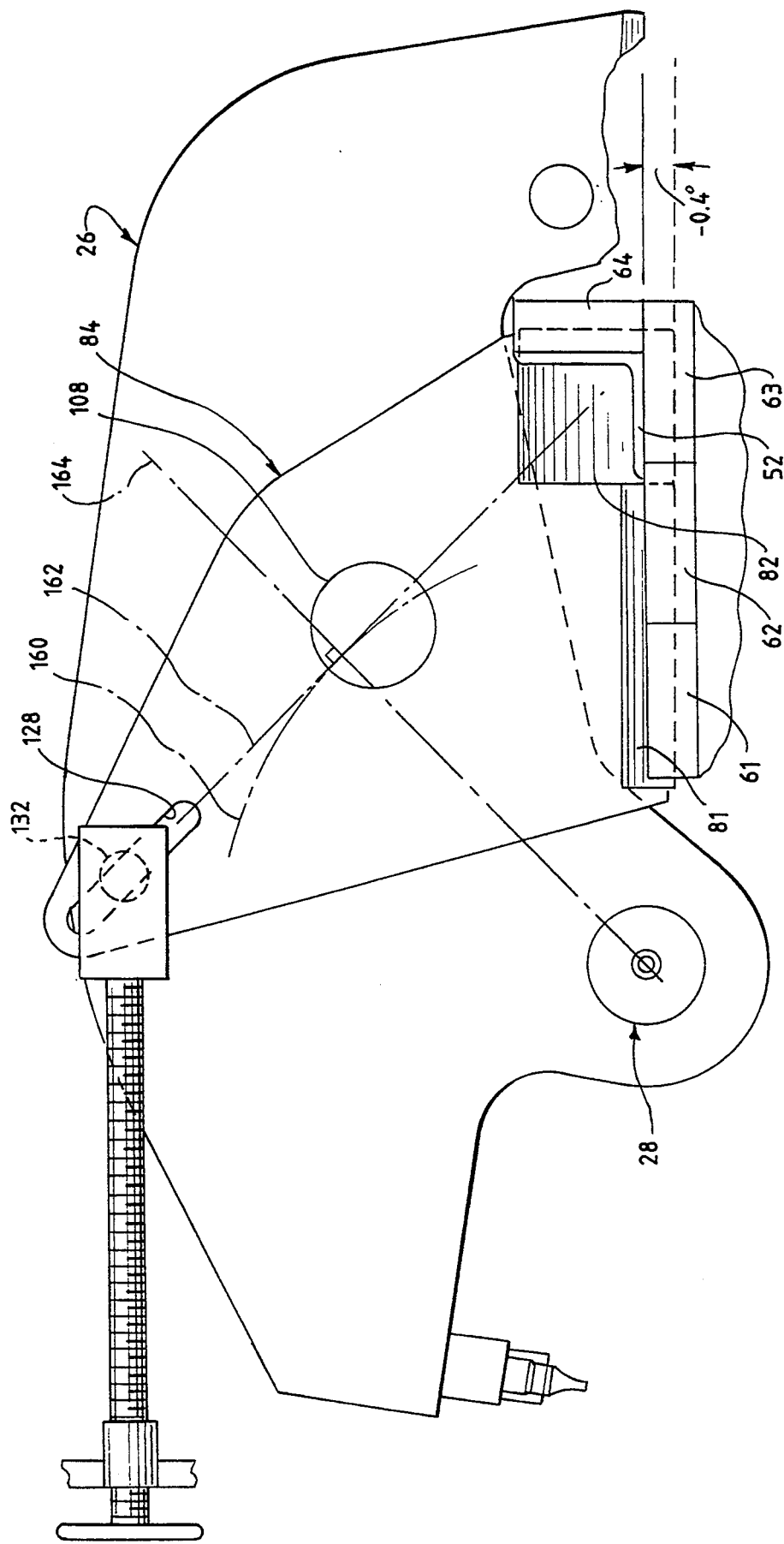
FIG. 11 is a view similar to FIG. 10 and shows the arm assembly pivoted further to carry the movable shear blade completely through the angle iron.
Figure 11A:
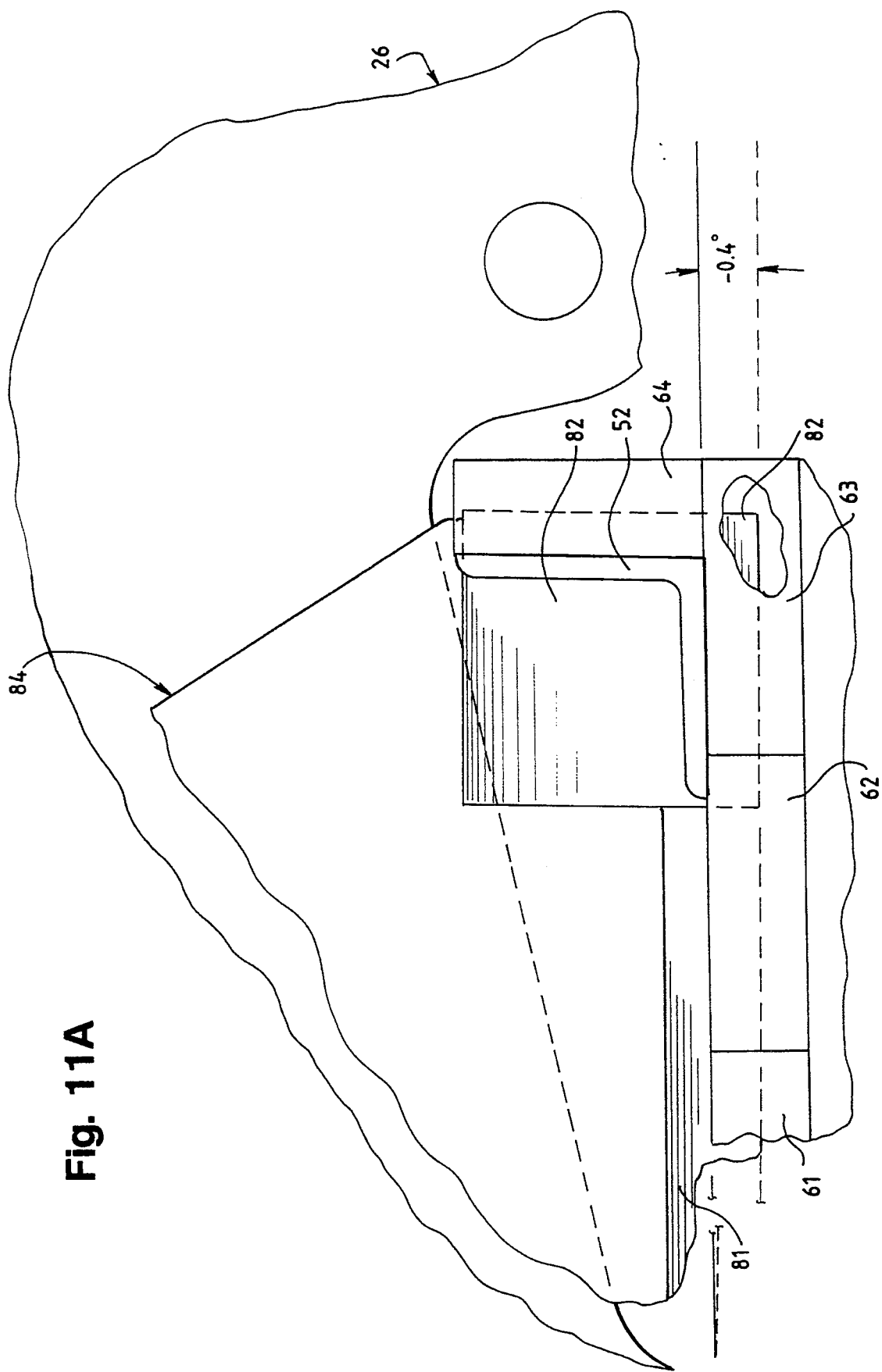
FIG. 11A is a greatly enlarged, fragmentary, view similar to FIG. 11.
Figure 12:
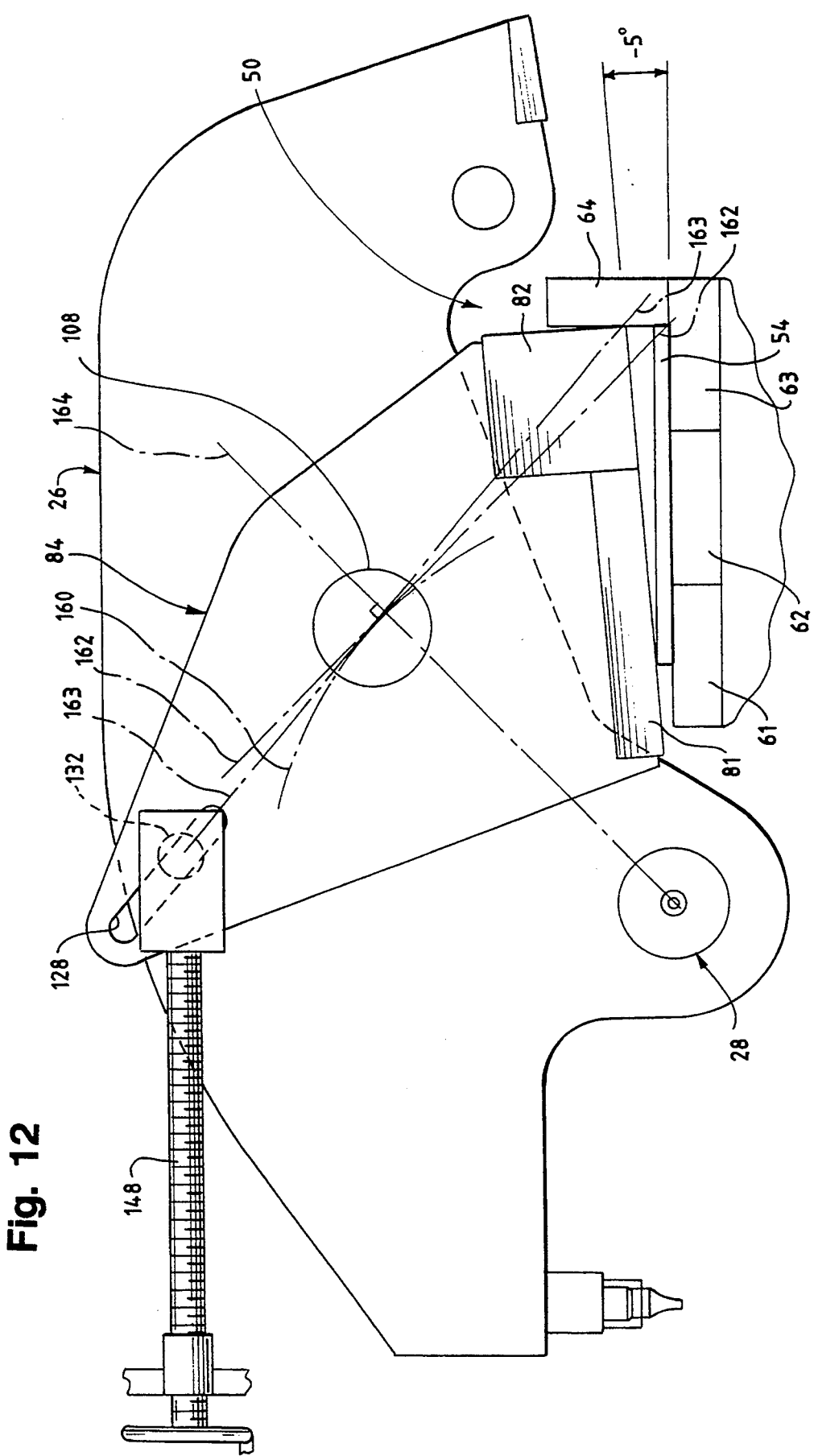
FIG. 12 is an partly diagrammatic, simplified, side elevational view of the arm assembly shown in a position prior to cutting flat stock with the movable shear blade just contacting the flat stock.

The shearing process is completed when the edges of the movable shear blades move past the edges of the stationary shear blades as illustrated in FIGS. 11 and 11A. The first arm 26 is pivoted to a selected lower most position to establish sufficient overlap of the blades. FIGS. 11 and 11A illustrate this overlap and show that the movable shear blade assembly has now become tilted in the opposite direction. That is, the angle defined by the movable blades and the stationary blades has now reversed, or become negative. For the selected bottom of stroke position, the angle is about −0.4°.

It will be appreciated that during the range of shearing movement while the movable shear blade 82 is in contact with the angle iron 52, the angle of the blade 82 relative to the stationary blades changes very little and is substantially 0°. For example, as shown in FIG. 9, the initial contact angle is 0.008°, and the angle becomes 0° as the blade 82 moves part way through the angle iron 52. The angle becomes slightly negative as the blade passes completely through the angle iron 52.

Owing to the relationship between the first arm pivot axis, second arm pivot axis, and selected position of the pin 132, the movable blade 82 moves through the angle iron 52 with the blade vertical edge substantially parallel to the angle iron vertical leg and with the blade horizontal edge substantially parallel to the angle iron horizontal leg. Thus the legs of the angle iron 52 are cut substantially simultaneously and without significant binding.

As the movable blades are pivoted from the open position (FIGS. 9 and 9A) to the closed position (FIGS. 11 and 11A), the pivot axis of the second arm 84 follows a circular arc path 160 (FIGS. 8, 9, 10, and 11). In typical installation, the radius of the arc path 160 (as between the arc path 160 and the first arm pivot axis in the bearing 28) is relatively large. On the other hand, the arc length traveled by the second arm 84 during the shearing process is relatively small. Thus, for a relatively large distance between the first arm pivot axis and the second arm pivot axis, the movement of the second arm 84 is relatively close to a straight line movement. Therefore, the corner or tip of the movable shear blade 82 moves along a path that is very close to being straight.

In a preferred embodiment, the components are arranged so that the tip of the blade 82 moves along a large radius arc path that substantially corresponds to a straight line 162 (FIGS. 8, 9, 10, and 11) which bisects the vertex of the 90° inside corner angle of the stationary shear blade assembly. Further, when the second arm 84 has reached the position (FIG. 10) where the bottom edges of the movable shear blades 81 and 82 are parallel to the edges of the stationary shear blades 61, 62, and 63, the line 162 also bisects the 90° outside corner angle defined by the movable shear blade 82 and passes through the pivot axis of the second arm 84 and through the center of the pin 132.

In the preferred embodiment, the longitudinal axis of the arm slot 128 is a straight line 163 (FIGS. 12, 13, and 14) that passes through the center of the pin 132, through the second arm pivot axis, and through the vertex of the 90° angle outside corner of the shear blade 82. When the distance between the pivot axis of the first arm 26 and the pivot axis of the second arm 84 is relatively large, and when the angle between the movable shear blade assembly and the stationary shear blade assembly is 0° or close to 0° as illustrated in FIGS. 8–11, the fixed line 162 bisecting the 90° angle inside corner of the stationary shear blade assembly is substantially coincident with the straight line 163. Accordingly, in FIGS. 8–11, these two substantially coincident lines are shown as the one line 162.

Further, as illustrated in FIGS. 8, 9, 10, and 11, a straight line 164 can be drawn perpendicular to the line 162 and passing through the first arm pivot axis. When the shearing apparatus is in the fully raised, open position illustrated in FIG. 8, the pivot axis of the second arm 84 is above the line 164 as illustrated in FIG. 8.

As the movable blades are moved toward the angle iron 52, the pivot axis of the second arm 84 moves closer to the line 164 as shown in FIG. 9. When the movable blades 81 and 82 are substantially parallel to the stationary blades as illustrated in FIG. 10, the pivot axis of the second arm 84 is coincident with the intersection of the lines 162 and 164. At this point, the tip of the blade 82 is on the straight line 162 that bisects the 90° angle inside corner of the stationary shear blades (and that necessarily also bisects the angle iron legs).

Finally, as the movable blades are moved down through the angle iron 52 as illustrated in FIG. 11, the second arm pivot axis moves on the arc 160 beyond the perpendicular line 164. However, because the range of movement along the arc 160 is so small compared to the radius of the arc 160, the tip of the blade 82 still remains very close to the straight line 162 that bisects the legs of the angle iron 52.

Figure 13:
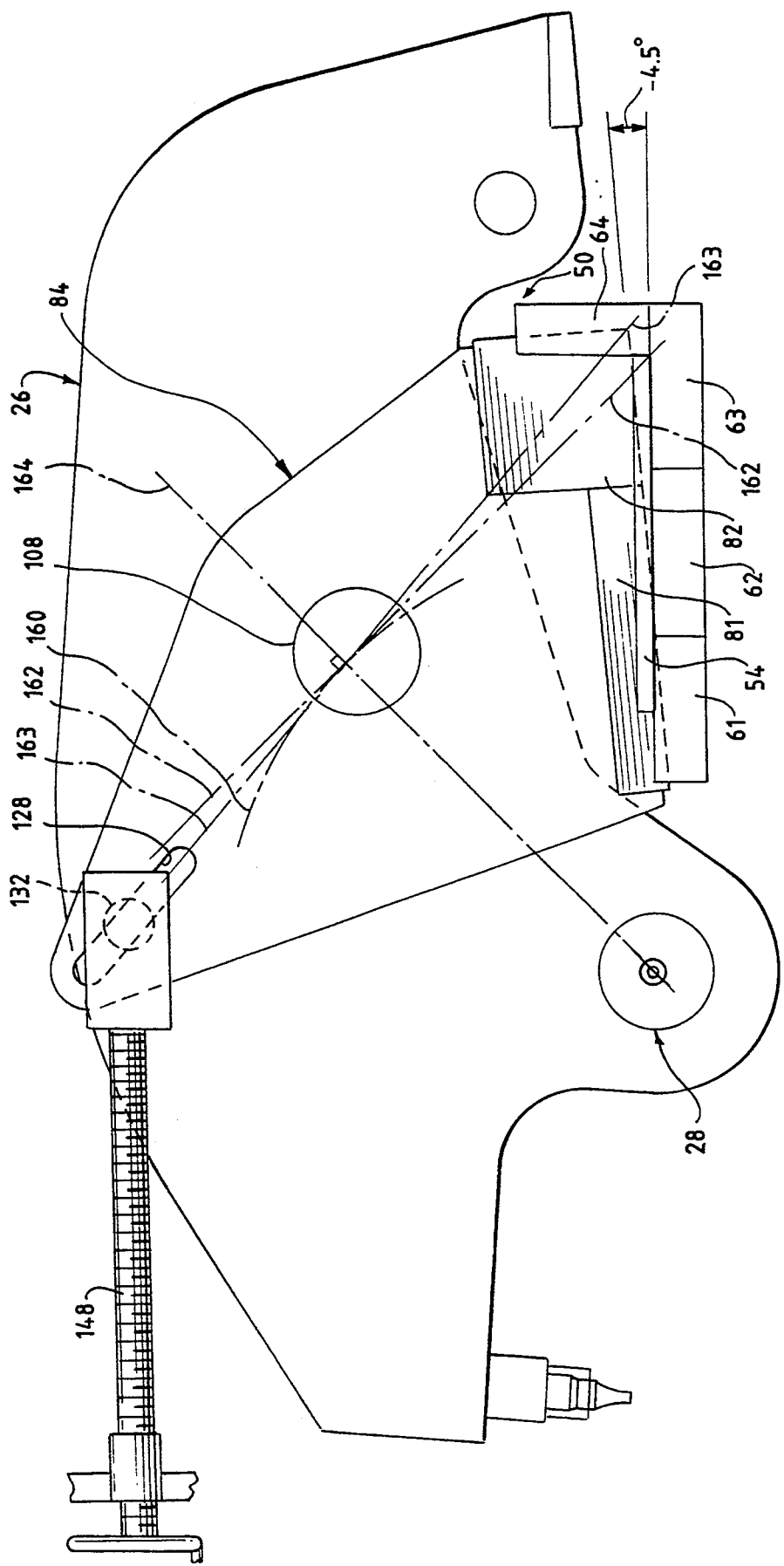
FIG. 13 is a view similar to FIG. 12 and shows the arm assembly moved to a position wherein the movable blade assembly has moved through about ½ of the width of the flat stock.

While the apparatus of the present invention can effectively shear angle iron as described above, the apparatus can also shear flat stock at the same receiving station 50. FIGS. 12–14 illustrate the apparatus in use shearing a flat stock workpiece 54.

Flat stock is most effectively sheared with at least one of the blade assemblies oriented at an angle relative to the other blade assembly. This provides a "scissors" cutting effect. The preferred angle depends upon the size and composition of the workpiece. Advantageously, the present apparatus permits the shear angle to be adjusted for cutting flat stock.

Figure 13A:
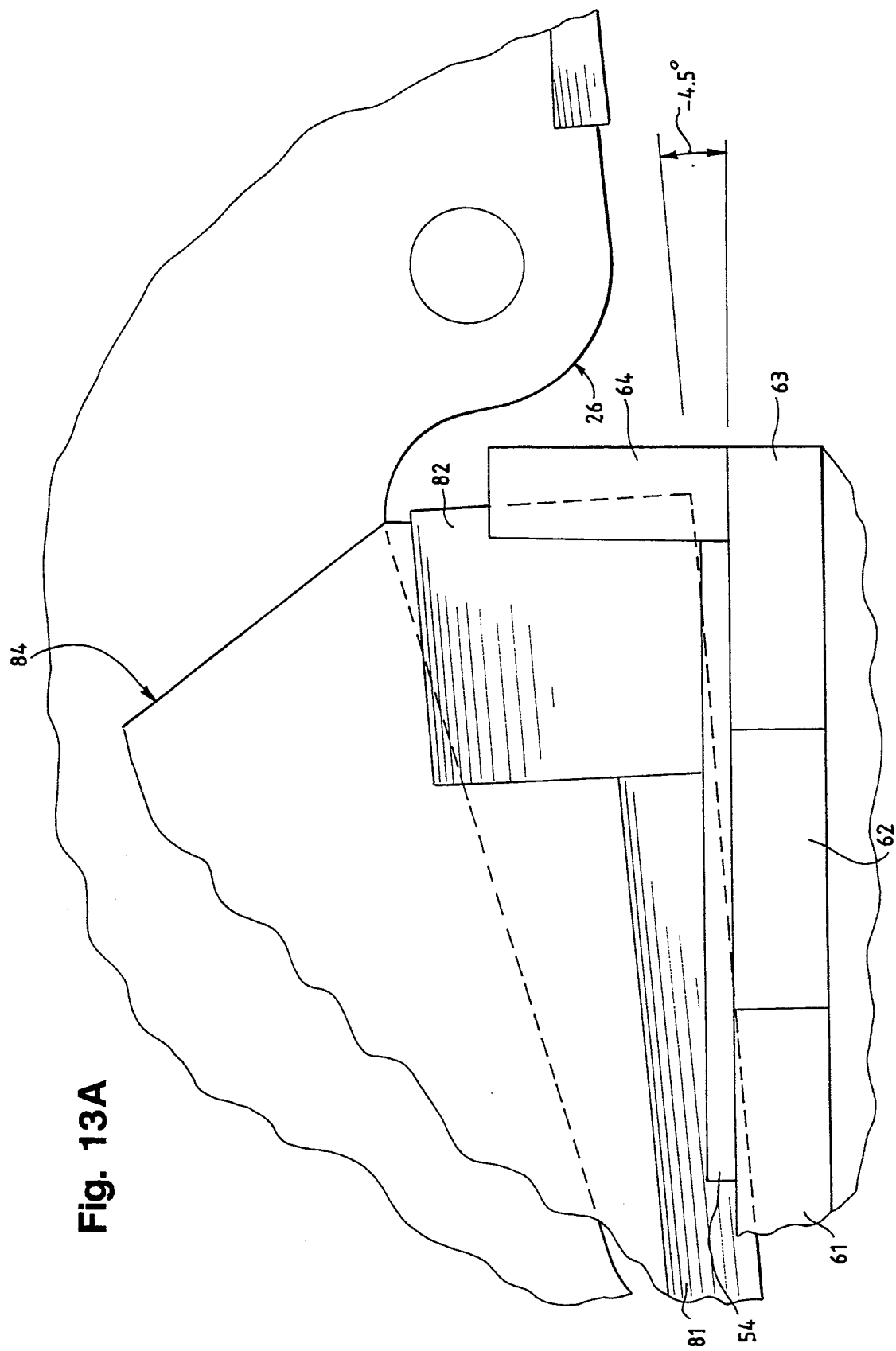
FIG. 13A is a greatly enlarged, fragmentary, view similar to FIG. 13.
Figure 14A:
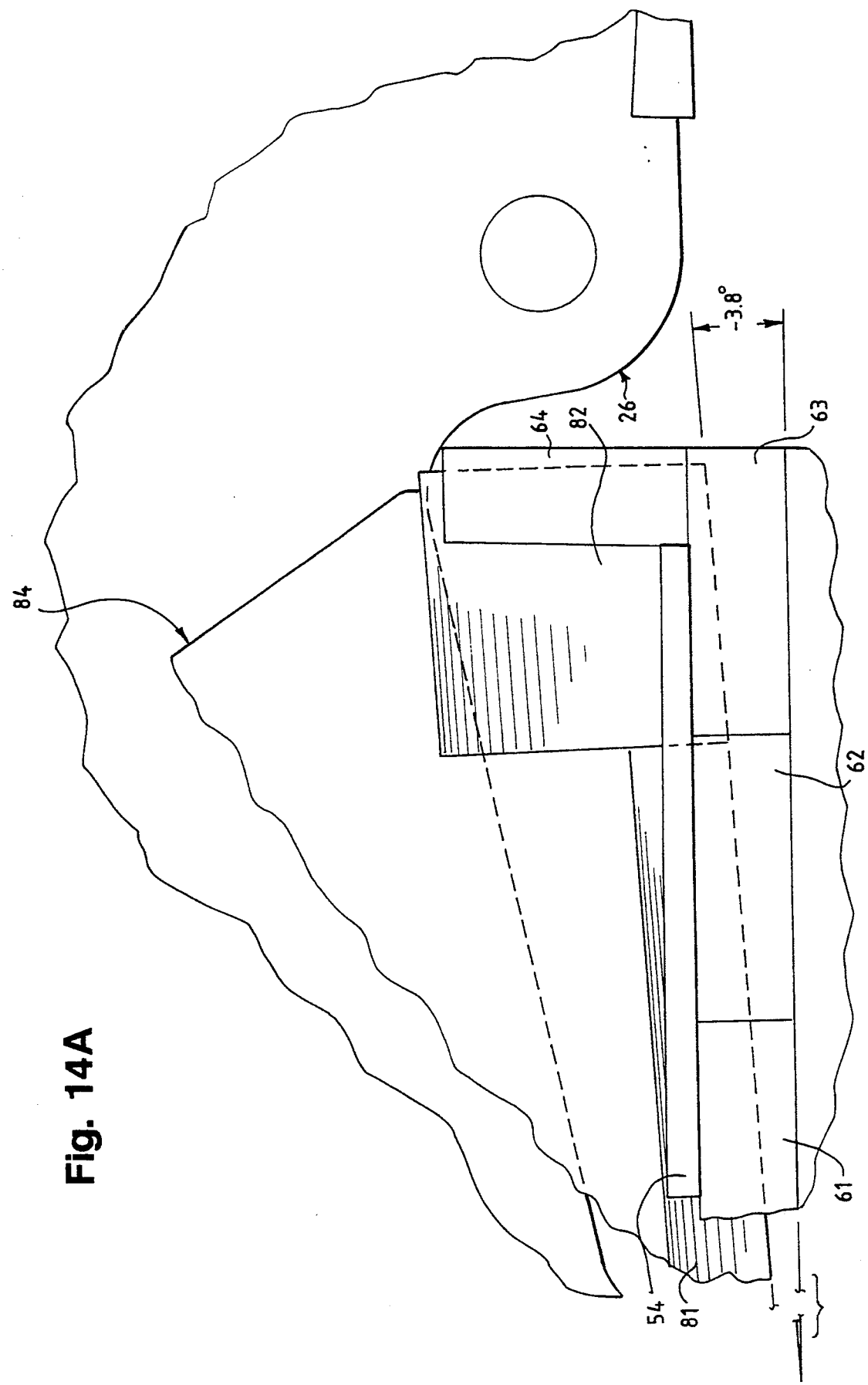
FIG. 14A is a greatly enlarged, fragmentary, view similar to FIG. 14.

For purposes of illustration, consider the flat stock 54 shown in FIG. 12 as having a thickness and composition which is most effectively sheared with the movable blade assembly tilted up at an angle of about −4.5°. In accordance with the preferred operation of the invention, the movable shear blade assembly is then adjusted so that it would have a −4.5° angle relative to the stationary blade assembly when about half of the flat stock 54 has been sheared (FIGS. 13 and 13A).

Figure 12A:
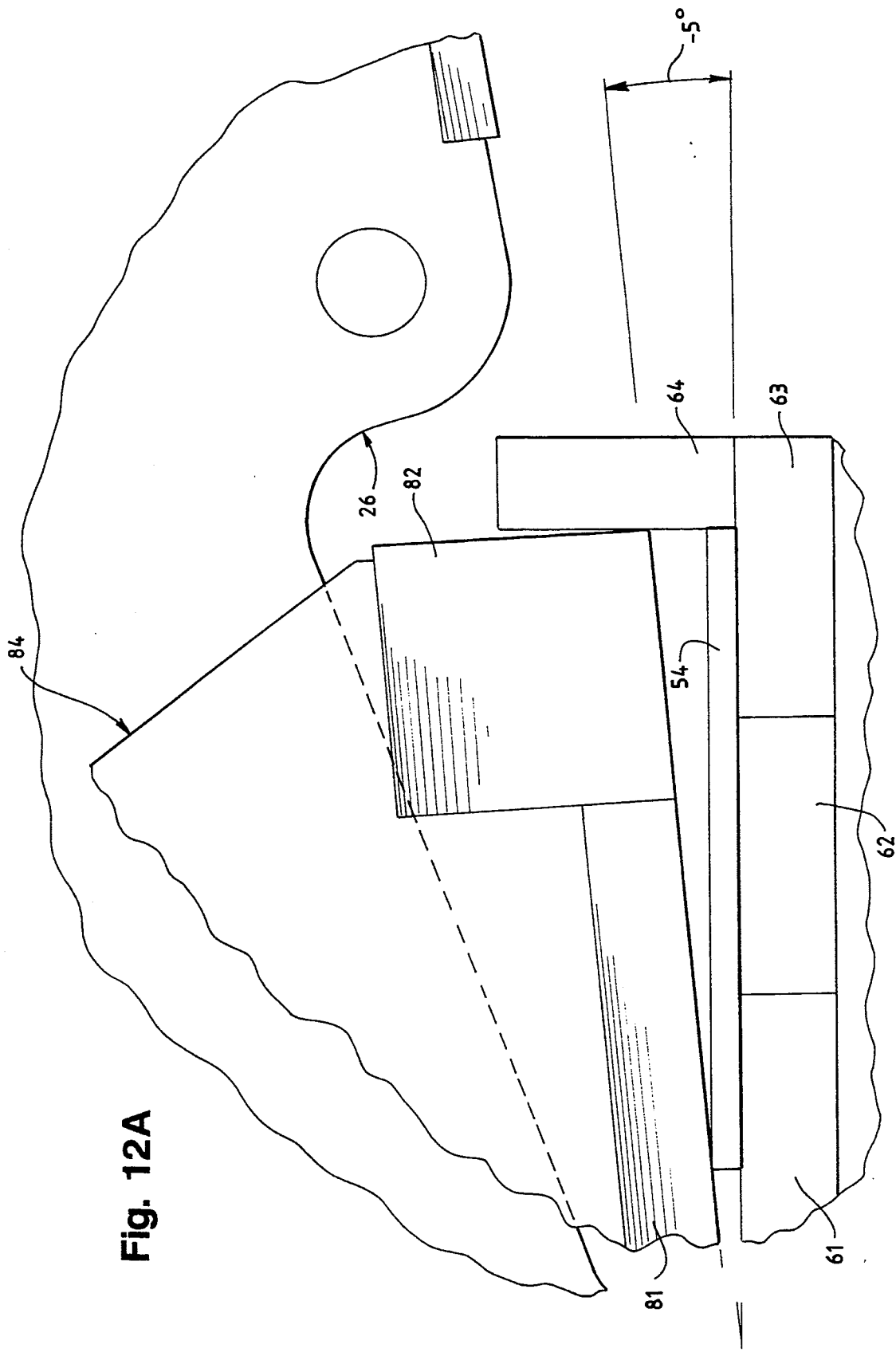
FIG. 12A is a greatly enlarged, fragmentary, view similar to FIG. 12.

In order to provide such a shear angle approximately half way through the shearing stroke, the guide pin 132 is adjusted so that the second arm 84 pivots about its axis on the first arm 26 to orient the movable shear blade assembly to about a −5° angle when the shear blade assemblies are in the open position (i.e., with the movable shear blade assembly blades 81 and 82 at the top of the stroke as shown in FIGS. 12 and 12A). Then, when the hydraulic piston-cylinder actuator is operated to pivot the first arm 26 clockwise, the second arm 84 is carried downwardly toward the flat stock 54, and the second arm 84 also pivots slightly in the counterclockwise direction as it is carried toward the flat stock 54 (owing to the engagement of the adjustment pin 132 with the slot 128). The angle thus decreases during the stroke until the stroke is completed. At the bottom of the stroke (FIGS. 14 and 14A), the movable shear blade assembly is at an angle of about −3.8° relative to the stationary shear blades 61, 62, and 63.

As the blades 81 and 82 move through the flat stock 54, there is only a very small change from the desired −4.5° shear angle. Typically, the shearing angle varies less than about 1° from the desired shear angle between the initial contact of the movable shear blades with the flat stock and the point at which the movable blade edges pass beyond the bottom of the flat stock 54.

Because a significant shear angle is desirable when shearing flat stock as illustrated in FIGS. 12–14, the second arm 84 is initially oriented at a sufficient angle so that the edges of the movable blades 81 and 82 remain at an angle to the flat stock during the shearing stroke. In this mode of operation, the 90° angle outside corner of the movable shear blade 82 may be significantly displaced from the line 162 which bisects the 90° angle inside corner of the stationary shear blades 63 and 64. Specifically, with reference to FIG. 12, the line 163 extends upwardly from the 90° angle outside corner of the movable shear blade 82 through the second arm pivot axis and along the longitudinal axis of the slot 128. For the particular arrangement illustrated in FIGS. 12, 13, and 14, the line 163 is skewed relative to, and crosses, the stationary blade inside corner bisecting line 162. For reference purposes in FIGS. 12, 13, and 14, line 164 is shown in a constant orientation perpendicular to the bisecting line 162 and passing through the pivot axis of the first arm 26.

A modified, and preferred, form of the blade arm adjustment assembly is illustrated in the embodiment of the apparatus shown in FIGS. 15–18. The modified apparatus is designated generally by the reference numeral 20A in FIG. 15 and is substantially identical to the apparatus 20 described above with reference to FIGS. 1–14 except that the modified apparatus 20A has a second arm 84A with a modified upper end for cooperating with a modified adjustment assembly.

Figure 18:
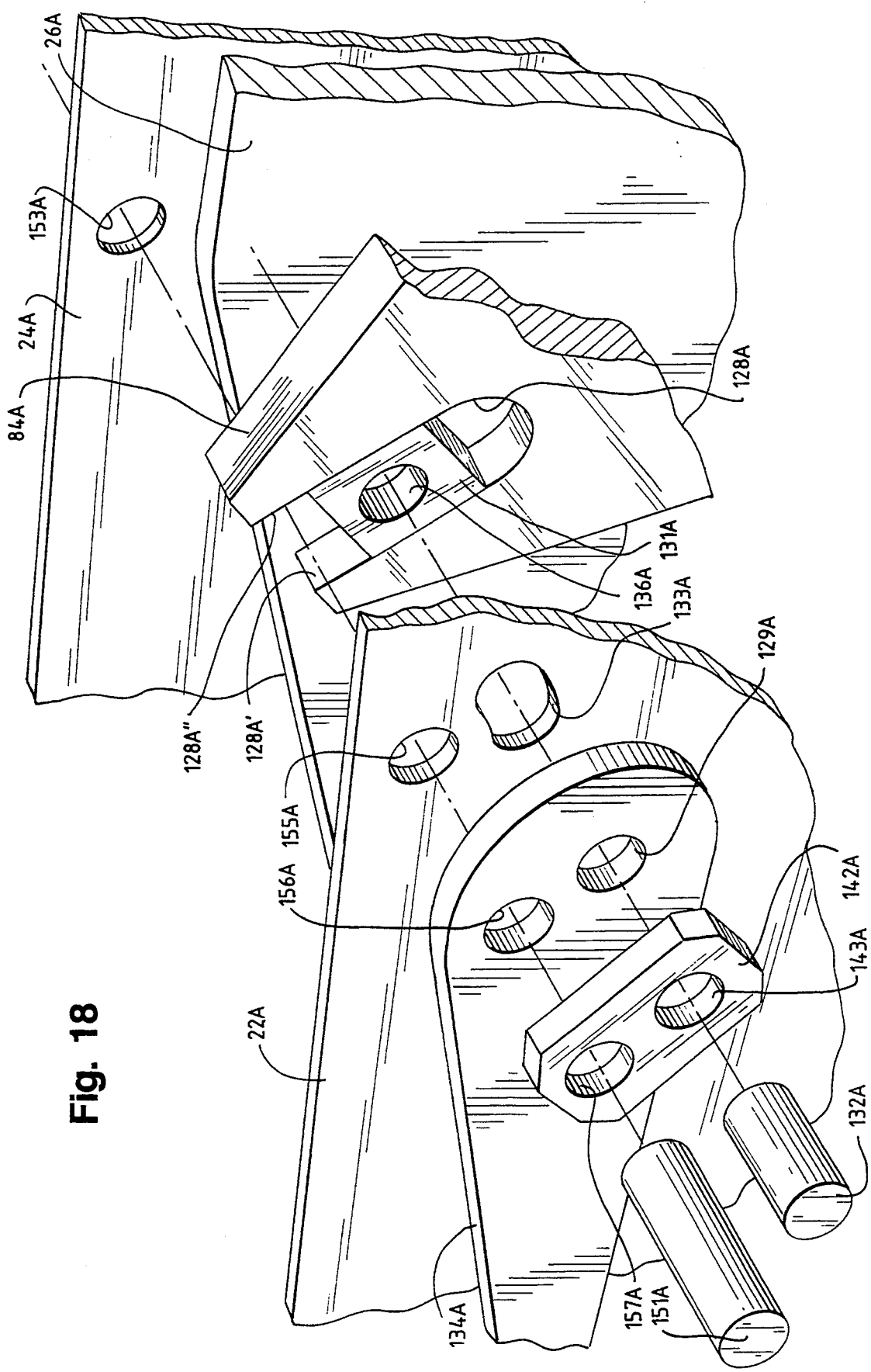
FIG. 18 is an enlarged, fragmentary exploded perspective view of the portion of the apparatus shown in FIG. 17.

In particular, the apparatus 20A includes a first arm 26A pivotally mounted with a bearing 28A to the frame having a front cover plate 22A and a rear cover plate 24A (FIGS. 16 and 18). The blade arm or second arm 84A is pivotally mounted with a shaft 108A to the first arm 26A in the same manner as the second arm 84 is mounted to the first arm 26 in the first embodiment described above with reference to FIGS. 1–14.

The frame defines a workpiece receiving station having a stationary blade assembly comprising stationary shear blades 61A, 62A, 63A, and 64A. A movable shear blade assembly, comprising shear blades 81A and 82A, is carried on the second arm 84A. A flat stock workpiece 54A is shown in the receiving station prior to being sheared. The stationary and movable shear blades of the apparatus 20A have substantially the same design, and operate in substantially the same way, as the shear blades of the apparatus 20 described above with reference to FIGS. 1–14.

The upper end of the second arm 84A defines a slot 128A which functions as a guide way, and the slot is defined, in part, by a pair of spaced-apart guide surfaces or walls 128A′ and 128A″ (FIG. 18). The walls 128A′ and 128A″ each have an elongate straight portion, and the slot 128A defined between the wall straight portions is substantially elongate. The longitudinal axis of the elongate portion of the slot 128A passes through the second arm pivot axis and bisects the 90° angle outside corner of the movable shear blade assembly.

The second arm slot 128A defined between the walls 128A′ and 128A″ slidably receives a guide member in the form of a guide block 131A. The guide block 131A can move along the second arm slot 128A. The guide block 131A defines a generally cylindrical bore 136A (FIG. 18) for receiving a pin 132A. The guide block 131A receives the pin 132A in the bore 136A in a manner that permits the guide block 131A to rotate on the pin 132A in either direction of rotation.

The pin 132A projects outwardly through an enlarged clearance slot 133A in the frame front cover plate 22A and through a bore 129A in an adjustment member or lever 134A. A retainer block 142A is welded to the front of the lever 134A. The retainer plate 142A defines a bore 143A (FIGS. 16 and 18) for receiving the pin 132A which projects therethrough and which is welded to the front surface of the retainer plate 142A.

Figure 15:
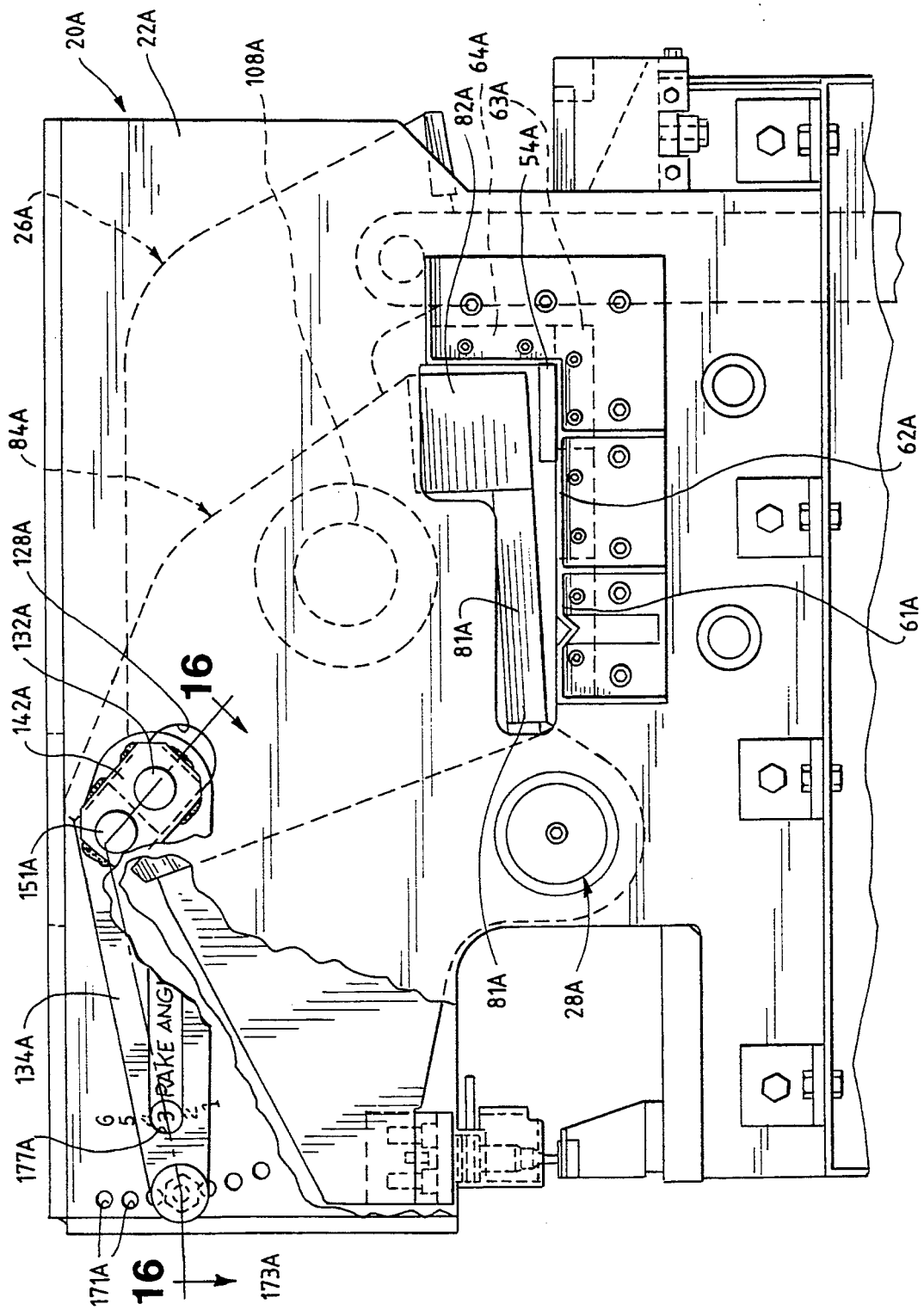
FIG. 15 is a fragmentary, side elevational view of a shearing apparatus incorporating a second embodiment of the present invention with portions broken away to illustrate interior detail.

The adjustment lever 134A is pivotally mounted to the apparatus frame with a pivot pin 151A. In particular, the pin 151A is received in a cylindrical bore 153A in the frame rear cover plate 24A and is received in a cylindrical bore 155A in the frame front cover plate 22A. The pin 151A passes over the top of the first arm 26A as can be seen in FIG. 15. The pin 151A also passes through the end of the second arm slot 128A. The pin 151A extends outwardly through a bore 156A in the lever 134A. The outer end of the pin 151A extends through a bore 157A in the retainer plate 142A (FIGS. 16 and 18). The end of the pin 151A is welded to the retainer plate 142A which is, as explained above, welded to the front of the adjustment lever 134A. Thus, both pins 151A and 132A are fixed to the lever arm 134A.

The pin 151A functions as a pivot shaft for the lever 134A intermediate first and second ends of the lever. The first end of the lever 134A, at the left hand side of the machine as viewed in FIGS. 15-18, is adapted to be moved upwardly or downwardly to adjust the angle of the lever 134A relative to the frame. The lever 134A and the pivot pin 151A rotate together about the longitudinal pivot axis of the pin 151A. At the first end of the lever there is an adjustable latch assembly to secure the lever 134A in a selected one of a plurality of orientations relative to the frame. In particular, the front cover plate 22A of the frame defines a plurality of spaced-apart bores 171A. The bores 171A .lie along a circular arc, the center of which is the longitudinal axis of the pin 151A.

The first end of the lever 134A carries an adjustment latch assembly 173A (FIGS. 15-17). The assembly 173A includes a knob 175A connected with a cross pin 177A to a shaft 179A. The shaft 179A is received within a bushing 181A which is threadingly mounted in a threaded aperture 183A defined in the first end of the lever 134A. The bushing 181A defines a first bore 185A for receiving an outer portion of the shaft 179A and defines an enlarged bore 187A for receiving an inner portion of the shaft 179A and a helical, compression spring 189A which is disposed around the shaft 179A. The shaft 179A includes an enlarged distal end portion 191A which is adapted to enter into a selected one of the frame apertures 171A. The compression spring 189A is retained within the bore 187A by the enlarged portion 191A of the shaft 179A.

The adjustment assembly knob 175A can be pulled outwardly, overcoming the biasing force of the spring 189A, to pull the shaft enlarged portion 191A out of the frame bore 171A. The lever 134A can then be pivoted to a new position, and the knob 175A can be released to permit the shaft enlarged portion 191A to be received in a new frame bore 171A so as to lock the lever 134A in the new orientation.

As can be seen in FIG. 17, the front surface of the frame front cover plate 22A can be provided with numbers or other indicia corresponding to a selected blade angle. The selected blade angle indicium is visible through an aperture 177A.

It will be apparent that as the adjustment lever 134A is pivoted about the longitudinal axis of the pivot pin 151A, the pin 132A on the second end of the lever will be swung in an arc. This will cause the guide block 131A to pivot the second arm 84A in one direction or another about its main pivot axis (pivot shaft 108A in FIG. 15). The movement of the pin 132A relative to the machine frame is accommodated by the sliding engagement of the guide block 131A in the second arm slot 128A. The guide block 131A is free to rotate as necessary about the pin 132A as the orientation of the guide block 131A changes owing to the change in the angle of the slot 128A.

After the desired orientation angle of the second arm 84A is established, the adjustment lever 134A is latched with the latch assembly 173A to maintain the pin 132A at the selected position. Subsequently, when the apparatus is operated to pivot the first arm 26A downwardly to shear a workpiece, the second arm 84A slides downwardly relative to the pin 132A and the guide block 131A. The guide block 131A remains retained within the slot 128A.

The use of the lever 134A to select an initial orientation of the second arm 84A is effective in establishing a desired initial angle for the movable shear blades 81A and 82A. If the distance between the first arm pivot axis (defined by the bearing 28A) and the second arm pivot axis (defined by the shaft 108A) is great enough, the blade angle will not change very much during the shearing of the workpiece. Thus, a substantially optimum blade angle can be selected with this embodiment of the apparatus 20A for shearing operation of flat stock and/or angle iron in substantially the same manner as described above for the first embodiment of the apparatus 20 illustrated in FIGS. 1-14.

It will be readily apparent from the foregoing detailed description of the invention and from the illustrations thereof that numerous variations and modifications may be effected without departing from the true spirit and scope of the novel concepts or principles of this invention.

What is claimed is:

1. An apparatus for selectively shearing angle iron and flat stock using only one set of interacting movable and stationary shear blade assemblies, said apparatus comprising:

a frame defining a single dual use receiving station for separately receiving one of said angle iron and said flat stock, said receiving station including a stationary shear blade assembly having two shearing edges extending from a vertex to define a generally 90° angle inside corner;

an arm assembly including a first arm pivotally mounted to said frame about a first pivot axis, said arm assembly including a second arm mounted to said first arm for pivoting movement about a second pivot axis, said second arm including a movable shear blade assembly having two shearing edges directed outwardly to define a generally 90° angle outside corner;

an actuator mounted on said frame for pivoting said arm assembly about said first pivot axis between an open position in which said movable and stationary shear blade assemblies are spaced apart and a closed position in which said shear blade assemblies are in an overlapped adjacent configuration; and said second arm defining a guide way and said frame having a guide member selectively positionable relative to said first axis for slidably engaging said guide way to pivot said second arm about said second pivot axis whereby the orientation of said movable shear blade relative to said stationary shear blade changes in a predetermined relationship as said arm assembly pivots between said open and closed positions.

2. The apparatus in accordance with claim 1 in which said guide member is mounted on an adjustment member carried by said frame and is movable to selected positions relative to said frame.

3. The apparatus in accordance with claim 2 in which said second arm defines a slot functioning as said guide way.

4. The apparatus in accordance with claim 3 in which said guide member is a pin projecting from said adjustment member into said slot.

5. The apparatus in accordance with claim 1 in which
said second arm defines a slot opening to one end of said second arm to function as said guide way; and
said guide member is a rectangular block slidably received in said slot.

6. The apparatus in accordance with claim 1 in which a line passing through said first and second pivot axes is substantially perpendicular to a line bisecting said 90° angle inside corner of said stationary shear blade assembly when said blade assemblies are parallel.

7. An apparatus for selectively shearing angle iron and flat stock, said apparatus comprising:
  a frame defining a receiving station for separately receiving one of said angle iron and said flat stock, said receiving station including a stationary shear blade assembly having two shearing edges extending from a vertex to define a generally 90° angle inside corner;
  an arm assembly including a first arm pivotally mounted to said frame about a first pivot axis, said arm assembly including a second arm mounted to said first arm for pivoting movement about a second pivot axis, said second arm including a movable shear blade assembly having two shearing edges directed outwardly to define a generally 90° angle outside corner;
  an actuator mounted on said frame for pivoting said arm assembly about said first pivot axis between an open position in which said movable and stationary shear blade assemblies are spaced apart and a closed position in which said shear blade assemblies are in an overlapped adjacent configuration; and
  said second arm defining a guide way and said frame having a guide member selectively positionable relative to said first axis for slidably engaging said guide way to pivot said second arm about said second pivot axis whereby the orientation of said movable shear blade relative to said stationary shear blade changes in a predetermined relationship as said arm assembly pivots between said open and closed positions, said guide member being mounted on an adjustment member carried by said frame and movable to selected positions relative to said frame, said second arm defining a slot functioning as said guide way,
  said slot including an elongate portion defined between two, spaced-apart, straight wall portions in said second arm, said slot elongate portion having a longitudinal centerline extending through said second arm second pivot axis and bisecting said 90° angle outside corner.

8. An apparatus for selectively shearing angle iron and flat stock, said apparatus comprising:
  a frame defining a receiving station for separately receiving one of said angle iron and said flat stock, said receiving station including a stationary shear blade assembly having two shearing edges extending from a vertex to define a generally 90° angle inside corner;
  an arm assembly including a first arm pivotally mounted to said frame about a first pivot axis, said arm assembly including a second arm mounted to said first arm for pivoting movement about a second pivot axis, said second arm including a movable shear blade assembly having two shearing edges directed outwardly to define a generally 90° angle outside corner;
  an actuator mounted on said frame for pivoting said arm assembly about said first pivot axis between an open position in which said movable and stationary shear blade assemblies are spaced apart and a closed position in which said shear blade assemblies are in an overlapped adjacent configuration; and
  said second arm defining a guide way and said frame having a guide member selectively positionable relative to said first axis for slidably engaging said guide way to pivot said second arch about said second pivot axis whereby the orientation of said movable shear blade relative to said stationary shear blade changes in a predetermined relationship as said arm assembly pivots between said open and closed positions, said guide member being mounted on an adjustment member carried by said frame and movable to selected positions relative to said frame, said second arm defining a slot functioning as said guide way, said guide member being a pin projecting from said adjustment member into said slot,
  said apparatus including a hand wheel and a hand wheel-driven shaft mounted for rotation relative to said frame; said shaft being threaded for at least a portion of its length, said frame including a threaded bracket threadingly engaged with said shaft to accommodate axial movement of said shaft relative to said bracket and frame when said hand wheel is turned; and
  said apparatus includes a pair of spaced-apart guide tracks mounted to said frame, said adjustment member being slidably disposed in said tracks and coupled to said shaft to accommodate rotation of said shaft relative to said adjustment member while said adjustment member is moved axially by said shaft.

9. An apparatus for selectively shearing angle iron and flat stock said apparatus comprising:
  a frame defining a receiving station for separately receiving one of said angle iron and said flat stock, said receiving station including a stationary shear blade assembly having two shearing edges extending from a vertex to define a generally 90° angle inside corner;
  an arm assembly including a first arm pivotally mounted to said frame about a first pivot axis, said arm assembly including a second arm mounted to said first arm for pivoting movement about a second pivot axis, said second arm including a movable shear blade assembly having two shearing edges directed outwardly to define a generally 90° angle outside corner;
  an actuator mounted on said frame for pivoting said arm assembly about said first pivot axis between an open position in which said movable and stationary shear blade assemblies are spaced apart and a closed position in which said shear blade assemblies are in an overlapped adjacent configuration; and said second arm defining a guide way and said frame having a guide member selectively positionable relative to said first axis for slidably engaging said guide way to pivot said second arm about said second pivot axis whereby the orientation of said movable shear blade relative to said stationary shear blade changes in a predetermined relationship as said arm assembly pivots between said open and closed positions, said guide member being mounted on an adjustment member carried by said frame and movable to selected positions relative to said frame, said second arm defining a slot functioning as said guide way, said guide member being a guide block that is pivotally mounted to said adjustment member and that is received in said slot.

10. The apparatus in accordance with claim 9 in which said adjustment member is a lever having first and second ends;

said apparatus includes a pivot shaft for pivotally mounting said lever to said frame intermediate the first and second ends of said lever;

said apparatus includes an adjustable latch at said lever first end to secure said lever in a selected one of a plurality of orientations relative to said frame;

said apparatus includes a pin fixed to said lever second end and projecting therefrom; and said guide block defines a bore for receiving an end of said pin whereby said guide block can pivot on said pin.

11. An apparatus for selectively shearing angle iron and flat stock using only one set of interacting movable and stationary shear blade assemblies, said apparatus comprising:

a frame defining a single dual use receiving station for receiving said flat stock, said receiving station including a stationary shear blade assembly having at least one shearing edge;

an arm assembly including a first arm pivotally mounted to said frame about a first pivot axis, said arm assembly including a second arm mounted to said first arm for pivoting movement about a second pivot axis, said second arm including a movable shear blade assembly defining at least one shearing edge;

an actuator mounted on said frame for pivoting said arm assembly about said first pivot axis between an open position in which said movable and stationary shear blade assemblies are spaced apart and a closed position in which said shear blade assemblies are closer together; and said second arm defining a guide way and said frame having a guide member selectively positionable relative to said first axis for slidably engaging said guide way to pivot said second arm about said second pivot axis whereby the orientation of said movable shear blade relative to said stationary shear blade changes in a predetermined relationship as said arm assembly pivots between said open and closed positions.

12. The apparatus in accordance with claim 11 in which said guide member is mounted on an adjustment member carried by said frame and is movable to selected positions relative to said frame.

13. The apparatus in accordance with claim 12 in which said second arm defines a slot functioning as said guide way.

14. The apparatus in accordance with claim 13 in which said guide member is a pin projecting from said adjustment member into said slot.

15. The apparatus in accordance with claim 11 in which said second arm defines a slot opening to one end of said second arm to function as said guide way; and said guide member is a rectangular block slidably received in said slot.

16. An apparatus for shearing flat stock, said apparatus comprising:

a frame defining a receiving station for receiving said flat stock, said receiving station including a stationary shear blade assembly having at least one shearing edge;

an arm assembly including a first arm pivotally mounted to said frame about a first pivot axis, said arm assembly including a second arm mounted to said first arm for pivoting movement about a second pivot axis, said second arm including a movable shear blade assembly defining at least one shearing edge;

an actuator mounted on said frame for pivoting said arm assembly about said first pivot axis between an open position in which said movable and stationary shear blade assemblies are spaced apart and a closed position in which said shear blade assemblies are closer together; and said second arm defining a guide way and said frame having a guide member selectively positionable relative to said first axis for slidably engaging said guide way to pivot said second arm about said second pivot axis whereby the orientation of said movable shear blade relative to said stationary shear blade changes in a predetermined relationship as said arm assembly pivots between said open and closed positions, said guide member being mounted on an adjustment member carried by said frame and movable to selected positions relative to said frame, said second arm defining a slot functioning as said guide way, said guide member being a guide block that is pivotally mounted to said adjustment member and that is received in said slot.

17. The apparatus in accordance with claim 16 in which said adjustment member is a lever having first and second ends;

said apparatus includes a pivot shaft for pivotally mounting said lever to said frame intermediate the first and second ends of said lever;

said apparatus includes an adjustable latch at said lever first end to secure said lever in a selected one of a plurality of orientations relative to said frame;

said apparatus includes a pin fixed to said lever second end and projecting therefrom; and said guide block defines a bore for receiving an end of said pin whereby said guide block can pivot on said pin.

18. An apparatus for shearing flat stock, said apparatus comprising:

a frame defining a receiving station for receiving said flat stock, said receiving station including a stationary shear blade assembly having at least one shearing edge;

an arm assembly including a first arm pivotally mounted to said frame about a first pivot axis, said arm assembly including a second arm mounted to said first arm for pivoting movement about a second pivot axis, said second arm including a movable shear blade assembly defining at least one shearing edge;

an actuator mounted on said frame for pivoting said arm assembly about said first pivot axis between an open position in which said movable and stationary shear blade assemblies are spaced apart and a closed position in which said shear blade assemblies are closer together; and said second arm defining a guide way and said frame having a guide member selectively positionable relative to said first axis for slidably engaging said guide way to pivot said second arm about said second pivot axis whereby the orientation of said movable shear blade relative to said stationary shear blade changes in a predetermined relationship as said arm assembly pivots between said open and closed positions, said guide member being mounted on an adjustment member carried by said frame and movable to selected positions relative to said frame, said second arm defining a slot functioning as said guide way, said guide member being a pin projecting from said adjustment member into said slot, said apparatus including a hand wheel and a hand wheel-driven shaft mounted for rotation relative to said frame; said shaft being threaded for at least a portion of its length, said frame including a threaded bracket threadingly engaged with said shaft to accommodate axial movement of said shaft relative to said bracket and frame when said hand wheel is turned; and said apparatus includes a pair of spaced-apart guide tracks mounted to said frame, said adjustment member being slidably disposed in said tracks and coupled to said shaft to accommodate rotation of said shaft relative to said adjustment member while said adjustment member is moved axially by said shaft.

* * * * *